United States Patent [19]
Demmer

[11] Patent Number: 5,621,477
[45] Date of Patent: Apr. 15, 1997

[54] DIGITAL DECODER AND METHOD FOR DECODING COMPOSITE VIDEO SIGNALS

[76] Inventor: Walter Demmer, Dormitzer Strasse 3, 90411 Nuremberg, Germany

[21] Appl. No.: 496,868

[22] Filed: Jun. 8, 1995

[30] Foreign Application Priority Data

Jul. 1, 1994 [DE] Germany .................... 44 23 226.8

[51] Int. Cl.$^6$ .................... H04N 7/12; H04N 7/36
[52] U.S. Cl. .................... 348/639; 348/726; 348/420; 348/412
[58] Field of Search .................... 348/725, 726, 348/727, 638, 639, 412, 420, 507, 508; H04N 7/12, 7/36

[56] References Cited

U.S. PATENT DOCUMENTS

| | | | |
|---|---|---|---|
| 4,054,909 | 10/1977 | Kojima et al. ........................... | 358/13 |
| 4,245,330 | 1/1981 | Rebourg ................................. | 364/826 |
| 4,463,377 | 7/1984 | Meyer-Ebrecht et al. ............ | 358/133 |
| 5,157,743 | 10/1992 | Maeda et al. .......................... | 382/56 |
| 5,384,868 | 1/1995 | Maeda et al. .......................... | 382/56 |
| 5,428,395 | 6/1995 | Jeong .................................... | 348/412 |

Primary Examiner—Michael H. Lee
Assistant Examiner—Glenton B. Burgess
Attorney, Agent, or Firm—Daniel J. Staudt

[57] ABSTRACT

A system for the digital decoding of composite video signals (CVBS), comprising a brightness signal (luminance component Y) and two color difference signals (chrominance components U, V). The system modulates a color subcarrier according to the quadrature amplitude modulation principle, in which a plurality (N) of sample values of the video signal are transformed by a Walsh-Hadamard transformation (WHT) from the pixel domain into the WHT domain. The color difference signals (U, V) are derived as specific WHT coefficients of the WHT matrix obtained. The WHT coefficients determining the color difference signals (U, V) are subtracted from the WHT matrix. The WHT matrix is transformed back into the pixel domain an inverse Walsh-Hadamard transformation (IWHT), and the brightness signal (Y) are derived from the IWHT result.

17 Claims, 12 Drawing Sheets

SPECTRUM OF $F_0$

SPECTRUM OF $F_1$

SPECTRUM OF $F_2$

SPECTRUM OF $F_3$

SPECTRUM OF $F_0$

SPECTRUM OF $F_1$

SPECTRUM OF $F_2$

SPECTRUM OF $F_3$

SPECTRUM OF $F_4$

SPECTRUM OF $F_5$

SPECTRUM OF $F_6$

SPECTRUM OF $F_7$

VERTICAL WALSH HADAMARD TRANSFORM

HORIZONTAL WHT

| WHT$_{0,0}$ | 0,00 | 0,05 | 0,10 | 0,15 | 0,20 | 0,25 | 0,30 | 0,35 | 0,40 | 0,45 | 0,50 |
|---|---|---|---|---|---|---|---|---|---|---|---|
| 0,00 | 8,00 | 7,51 | 6,16 | 4,19 | 2,00 | 0,00 | 1,45 | 2,13 | 2,00 | 1,19 | 0,00 |
| 0,05 | 7,90 | 7,42 | 6,08 | 4,14 | 1,98 | 0,00 | 1,44 | 2,11 | 1,98 | 1,18 | 0,00 |
| 0,10 | 7,61 | 7,15 | 5,85 | 3,98 | 1,90 | 0,00 | 1,38 | 2,03 | 1,90 | 1,13 | 0,00 |
| 0,15 | 7,13 | 6,70 | 5,48 | 3,73 | 1,78 | 0,00 | 1,29 | 1,90 | 1,78 | 1,06 | 0,00 |
| 0,20 | 6,47 | 6,08 | 4,98 | 3,39 | 1,62 | 0,00 | 1,18 | 1,73 | 1,62 | 0,96 | 0,00 |
| 0,25 | 5,66 | 5,31 | 4,35 | 2,96 | 1,41 | 0,00 | 1,03 | 1,51 | 1,41 | 0,84 | 0,00 |
| 0,30 | 4,70 | 4,42 | 3,62 | 2,46 | 1,18 | 0,00 | 0,85 | 1,25 | 1,18 | 0,70 | 0,00 |
| 0,35 | 3,63 | 3,41 | 2,79 | 1,90 | 0,91 | 0,00 | 0,66 | 0,97 | 0,91 | 0,54 | 0,00 |
| 0,40 | 2,47 | 2,32 | 1,90 | 1,29 | 0,62 | 0,00 | 0,45 | 0,66 | 0,62 | 0,37 | 0,00 |
| 0,45 | 1,25 | 1,18 | 0,96 | 0,66 | 0,31 | 0,00 | 0,23 | 0,33 | 0,31 | 0,19 | 0,00 |
| 0,50 | 0,00 | 0,00 | 0,00 | 0,00 | 0,00 | 0,00 | 0,00 | 0,00 | 0,00 | 0,00 | 0,00 |

| WHT$_{0,1}$ | 0,00 | 0,05 | 0,10 | 0,15 | 0,20 | 0,25 | 0,30 | 0,35 | 0,40 | 0,45 | 0,50 |
|---|---|---|---|---|---|---|---|---|---|---|---|
| 0,00 | 0,00 | 2,44 | 4,47 | 5,77 | 6,16 | 5,66 | 4,47 | 2,94 | 1,45 | 0,39 | 0,00 |
| 0,05 | 0,00 | 2,41 | 4,42 | 5,70 | 6,08 | 5,59 | 4,42 | 2,90 | 1,44 | 0,38 | 0,00 |
| 0,10 | 0,00 | 2,32 | 4,25 | 5,48 | 5,85 | 5,38 | 4,25 | 2,79 | 1,38 | 0,37 | 0,00 |
| 0,15 | 0,00 | 2,18 | 3,98 | 5,14 | 5,48 | 5,04 | 3,98 | 2,62 | 1,29 | 0,34 | 0,00 |
| 0,20 | 0,00 | 1,98 | 3,62 | 4,67 | 4,98 | 4,58 | 3,62 | 2,38 | 1,18 | 0,31 | 0,00 |
| 0,25 | 0,00 | 1,73 | 3,16 | 4,08 | 4,35 | 4,00 | 3,16 | 2,08 | 1,03 | 0,27 | 0,00 |
| 0,30 | 0,00 | 1,44 | 2,63 | 3,39 | 3,62 | 3,33 | 2,63 | 1,73 | 0,85 | 0,23 | 0,00 |
| 0,35 | 0,00 | 1,11 | 2,03 | 2,62 | 2,79 | 2,57 | 2,03 | 1,33 | 0,66 | 0,18 | 0,00 |
| 0,40 | 0,00 | 0,75 | 1,38 | 1,78 | 1,90 | 1,75 | 1,38 | 0,91 | 0,45 | 0,12 | 0,00 |
| 0,45 | 0,00 | 0,38 | 0,70 | 0,90 | 0,96 | 0,88 | 0,70 | 0,46 | 0,23 | 0,06 | 0,00 |
| 0,50 | 0,00 | 0,00 | 0,00 | 0,00 | 0,00 | 0,00 | 0,00 | 0,00 | 0,00 | 0,00 | 0,00 |

| WHT$_{0,2}$ | 0,00 | 0,05 | 0,10 | 0,15 | 0,20 | 0,25 | 0,30 | 0,35 | 0,40 | 0,45 | 0,50 |
|---|---|---|---|---|---|---|---|---|---|---|---|
| 0,00 | 0,00 | 0,39 | 1,45 | 2,94 | 4,47 | 5,66 | 6,16 | 5,77 | 4,47 | 2,44 | 0,00 |
| 0,05 | 0,00 | 0,38 | 1,44 | 2,90 | 4,42 | 5,59 | 6,08 | 5,70 | 4,42 | 2,41 | 0,00 |
| 0,10 | 0,00 | 0,37 | 1,38 | 2,79 | 4,25 | 5,38 | 5,85 | 5,48 | 4,25 | 2,32 | 0,00 |
| 0,15 | 0,00 | 0,34 | 1,29 | 2,62 | 3,98 | 5,04 | 5,48 | 5,14 | 3,98 | 2,18 | 0,00 |
| 0,20 | 0,00 | 0,31 | 1,18 | 2,38 | 3,62 | 4,58 | 4,98 | 4,67 | 3,62 | 1,98 | 0,00 |
| 0,25 | 0,00 | 0,27 | 1,03 | 2,08 | 3,16 | 4,00 | 4,35 | 4,08 | 3,16 | 1,73 | 0,00 |
| 0,30 | 0,00 | 0,23 | 0,85 | 1,73 | 2,63 | 3,33 | 3,62 | 3,39 | 2,63 | 1,44 | 0,00 |
| 0,35 | 0,00 | 0,18 | 0,66 | 1,33 | 2,03 | 2,57 | 2,79 | 2,62 | 2,03 | 1,11 | 0,00 |
| 0,40 | 0,00 | 0,12 | 0,45 | 0,91 | 1,38 | 1,75 | 1,90 | 1,78 | 1,38 | 0,75 | 0,00 |
| 0,45 | 0,00 | 0,06 | 0,23 | 0,46 | 0,70 | 0,88 | 0,96 | 0,90 | 0,70 | 0,38 | 0,00 |
| 0,50 | 0,00 | 0,00 | 0,00 | 0,00 | 0,00 | 0,00 | 0,00 | 0,00 | 0,00 | 0,00 | 0,00 |

| WHT$_{0,3}$ | 0,00 | 0,05 | 0,10 | 0,15 | 0,20 | 0,25 | 0,30 | 0,35 | 0,40 | 0,45 | 0,50 |
|---|---|---|---|---|---|---|---|---|---|---|---|
| 0,00 | 0,00 | 1,19 | 2,00 | 2,13 | 1,45 | 0,00 | 2,00 | 4,19 | 6,16 | 7,51 | 8,00 |
| 0,05 | 0,00 | 1,18 | 1,98 | 2,11 | 1,44 | 0,00 | 1,98 | 4,14 | 6,08 | 7,42 | 7,90 |
| 0,10 | 0,00 | 1,13 | 1,90 | 2,03 | 1,38 | 0,00 | 1,90 | 3,98 | 5,85 | 7,15 | 7,61 |
| 0,15 | 0,00 | 1,06 | 1,78 | 1,90 | 1,29 | 0,00 | 1,78 | 3,73 | 5,48 | 6,70 | 7,13 |
| 0,20 | 0,00 | 0,96 | 1,62 | 1,73 | 1,18 | 0,00 | 1,62 | 3,39 | 4,98 | 6,08 | 6,47 |
| 0,25 | 0,00 | 0,84 | 1,41 | 1,51 | 1,03 | 0,00 | 1,41 | 2,96 | 4,35 | 5,31 | 5,66 |
| 0,30 | 0,00 | 0,70 | 1,18 | 1,25 | 0,85 | 0,00 | 1,18 | 2,46 | 3,62 | 4,42 | 4,70 |
| 0,35 | 0,00 | 0,54 | 0,91 | 0,97 | 0,66 | 0,00 | 0,91 | 1,90 | 2,79 | 3,41 | 3,63 |
| 0,40 | 0,00 | 0,37 | 0,62 | 0,66 | 0,45 | 0,00 | 0,62 | 1,29 | 1,90 | 2,32 | 2,47 |
| 0,45 | 0,00 | 0,19 | 0,31 | 0,33 | 0,23 | 0,00 | 0,31 | 0,66 | 0,96 | 1,18 | 1,25 |
| 0,50 | 0,00 | 0,00 | 0,00 | 0,00 | 0,00 | 0,00 | 0,00 | 0,00 | 0,00 | 0,00 | 0,00 |

| WHT$_{1,0}$ | 0,00 | 0,05 | 0,10 | 0,15 | 0,20 | 0,25 | 0,30 | 0,35 | 0,40 | 0,45 | 0,50 |
|---|---|---|---|---|---|---|---|---|---|---|---|
| 0,00 | 0,00 | 0,00 | 0,00 | 0,00 | 0,00 | 0,00 | 0,00 | 0,00 | 0,00 | 0,00 | 0,00 |
| 0,05 | 1,25 | 1,18 | 0,96 | 0,66 | 0,31 | 0,00 | 0,23 | 0,33 | 0,31 | 0,19 | 0,00 |
| 0,10 | 2,47 | 2,32 | 1,90 | 1,29 | 0,62 | 0,00 | 0,45 | 0,66 | 0,62 | 0,37 | 0,00 |
| 0,15 | 3,63 | 3,41 | 2,79 | 1,90 | 0,91 | 0,00 | 0,66 | 0,97 | 0,91 | 0,54 | 0,00 |
| 0,20 | 4,70 | 4,42 | 3,62 | 2,46 | 1,18 | 0,00 | 0,85 | 1,25 | 1,18 | 0,70 | 0,00 |
| 0,25 | 5,66 | 5,31 | 4,35 | 2,96 | 1,41 | 0,00 | 1,03 | 1,51 | 1,41 | 0,84 | 0,00 |
| 0,30 | 6,47 | 6,08 | 4,98 | 3,39 | 1,62 | 0,00 | 1,18 | 1,73 | 1,62 | 0,96 | 0,00 |
| 0,35 | 7,13 | 6,70 | 5,48 | 3,73 | 1,78 | 0,00 | 1,29 | 1,90 | 1,78 | 1,06 | 0,00 |
| 0,40 | 7,61 | 7,15 | 5,85 | 3,98 | 1,90 | 0,00 | 1,38 | 2,03 | 1,90 | 1,13 | 0,00 |
| 0,45 | 7,90 | 7,42 | 6,08 | 4,14 | 1,98 | 0,00 | 1,44 | 2,11 | 1,98 | 1,18 | 0,00 |
| 0,50 | 8,00 | 7,51 | 6,16 | 4,19 | 2,00 | 0,00 | 1,45 | 2,13 | 2,00 | 1,19 | 0,00 |

| WHT$_{1,1}$ | 0,00 | 0,05 | 0,10 | 0,15 | 0,20 | 0,25 | 0,30 | 0,35 | 0,40 | 0,45 | 0,50 |
|---|---|---|---|---|---|---|---|---|---|---|---|
| 0,00 | 0,00 | 0,00 | 0,00 | 0,00 | 0,00 | 0,00 | 0,00 | 0,00 | 0,00 | 0,00 | 0,00 |
| 0,05 | 0,00 | 0,38 | 0,70 | 0,90 | 0,96 | 0,88 | 0,70 | 0,46 | 0,23 | 0,06 | 0,00 |
| 0,10 | 0,00 | 0,75 | 1,38 | 1,78 | 1,90 | 1,75 | 1,38 | 0,91 | 0,45 | 0,12 | 0,00 |
| 0,15 | 0,00 | 1,11 | 2,03 | 2,62 | 2,79 | 2,57 | 2,03 | 1,33 | 0,66 | 0,18 | 0,00 |
| 0,20 | 0,00 | 1,44 | 2,63 | 3,39 | 3,62 | 3,33 | 2,63 | 1,73 | 0,85 | 0,23 | 0,00 |
| 0,25 | 0,00 | 1,73 | 3,16 | 4,08 | 4,35 | 4,00 | 3,16 | 2,08 | 1,03 | 0,27 | 0,00 |
| 0,30 | 0,00 | 1,98 | 3,62 | 4,67 | 4,98 | 4,58 | 3,62 | 2,38 | 1,18 | 0,31 | 0,00 |
| 0,35 | 0,00 | 2,18 | 3,98 | 5,14 | 5,48 | 5,04 | 3,98 | 2,62 | 1,29 | 0,34 | 0,00 |
| 0,40 | 0,00 | 2,32 | 4,25 | 5,48 | 5,85 | 5,38 | 4,25 | 2,79 | 1,38 | 0,37 | 0,00 |
| 0,45 | 0,00 | 2,41 | 4,42 | 5,70 | 6,08 | 5,59 | 4,42 | 2,90 | 1,44 | 0,38 | 0,00 |
| 0,50 | 0,00 | 2,44 | 4,47 | 5,77 | 6,16 | 5,66 | 4,47 | 2,94 | 1,45 | 0,39 | 0,00 |

| WHT$_{1,2}$ | 0,00 | 0,05 | 0,10 | 0,15 | 0,20 | 0,25 | 0,30 | 0,35 | 0,40 | 0,45 | 0,50 |
|---|---|---|---|---|---|---|---|---|---|---|---|
| 0,00 | 0,00 | 0,00 | 0,00 | 0,00 | 0,00 | 0,00 | 0,00 | 0,00 | 0,00 | 0,00 | 0,00 |
| 0,05 | 0,00 | 0,06 | 0,23 | 0,46 | 0,70 | 0,88 | 0,96 | 0,90 | 0,70 | 0,38 | 0,00 |
| 0,10 | 0,00 | 0,12 | 0,45 | 0,91 | 1,38 | 1,75 | 1,90 | 1,78 | 1,38 | 0,75 | 0,00 |
| 0,15 | 0,00 | 0,18 | 0,66 | 1,33 | 2,03 | 2,57 | 2,79 | 2,62 | 2,03 | 1,11 | 0,00 |
| 0,20 | 0,00 | 0,23 | 0,85 | 1,73 | 2,63 | 3,33 | 3,62 | 3,39 | 2,63 | 1,44 | 0,00 |
| 0,25 | 0,00 | 0,27 | 1,03 | 2,08 | 3,16 | 4,00 | 4,35 | 4,08 | 3,16 | 1,73 | 0,00 |
| 0,30 | 0,00 | 0,31 | 1,18 | 2,38 | 3,62 | 4,58 | 4,98 | 4,67 | 3,62 | 1,98 | 0,00 |
| 0,35 | 0,00 | 0,34 | 1,29 | 2,62 | 3,98 | 5,04 | 5,48 | 5,14 | 3,98 | 2,18 | 0,00 |
| 0,40 | 0,00 | 0,37 | 1,38 | 2,79 | 4,25 | 5,38 | 5,85 | 5,48 | 4,25 | 2,32 | 0,00 |
| 0,45 | 0,00 | 0,38 | 1,44 | 2,90 | 4,42 | 5,59 | 6,08 | 5,70 | 4,42 | 2,41 | 0,00 |
| 0,50 | 0,00 | 0,39 | 1,45 | 2,94 | 4,47 | 5,66 | 6,16 | 5,77 | 4,47 | 2,44 | 0,00 |

| WHT$_{1,3}$ | 0,00 | 0,05 | 0,10 | 0,15 | 0,20 | 0,25 | 0,30 | 0,35 | 0,40 | 0,45 | 0,50 |
|---|---|---|---|---|---|---|---|---|---|---|---|
| 0,00 | 0,00 | 0,00 | 0,00 | 0,00 | 0,00 | 0,00 | 0,00 | 0,00 | 0,00 | 0,00 | 0,00 |
| 0,05 | 0,00 | 0,19 | 0,31 | 0,33 | 0,23 | 0,00 | 0,31 | 0,66 | 0,96 | 1,18 | 1,25 |
| 0,10 | 0,00 | 0,37 | 0,62 | 0,66 | 0,45 | 0,00 | 0,62 | 1,29 | 1,90 | 2,32 | 2,47 |
| 0,15 | 0,00 | 0,54 | 0,91 | 0,97 | 0,66 | 0,00 | 0,91 | 1,90 | 2,79 | 3,41 | 3,63 |
| 0,20 | 0,00 | 0,70 | 1,18 | 1,25 | 0,85 | 0,00 | 1,18 | 2,46 | 3,62 | 4,42 | 4,70 |
| 0,25 | 0,00 | 0,84 | 1,41 | 1,51 | 1,03 | 0,00 | 1,41 | 2,96 | 4,35 | 5,31 | 5,66 |
| 0,30 | 0,00 | 0,96 | 1,62 | 1,73 | 1,18 | 0,00 | 1,62 | 3,39 | 4,98 | 6,08 | 6,47 |
| 0,35 | 0,00 | 1,06 | 1,78 | 1,90 | 1,29 | 0,00 | 1,78 | 3,73 | 5,48 | 6,70 | 7,13 |
| 0,40 | 0,00 | 1,13 | 1,90 | 2,03 | 1,38 | 0,00 | 1,90 | 3,98 | 5,85 | 7,15 | 7,61 |
| 0,45 | 0,00 | 1,18 | 1,98 | 2,11 | 1,44 | 0,00 | 1,98 | 4,14 | 6,08 | 7,42 | 7,90 |
| 0,50 | 0,00 | 1,19 | 2,00 | 2,13 | 1,45 | 0,00 | 2,00 | 4,19 | 6,16 | 7,51 | 8,00 |

| Y | 0.00 | 0.05 | 0.10 | 0.15 | 0.20 | 0.25 | 0.30 | 0.35 | 0.40 | 0.45 | 0.50 |
|---|---|---|---|---|---|---|---|---|---|---|---|
| 0.00 | 8.00 | 8.00 | 8.00 | 8.00 | 8.00 | 8.00 | 8.00 | 8.00 | 8.00 | 8.00 | 8.00 |
| 0.05 | 8.00 | 7.99 | 7.97 | 7.94 | 7.91 | 7.90 | 7.91 | 7.94 | 7.97 | 7.99 | 8.00 |
| 0.10 | 8.00 | 7.96 | 7.87 | 7.75 | 7.65 | 7.61 | 7.65 | 7.75 | 7.87 | 7.96 | 8.00 |
| 0.15 | 8.00 | 7.92 | 7.71 | 7.44 | 7.22 | 7.13 | 7.22 | 7.44 | 7.71 | 7.92 | 8.00 |
| 0.20 | 8.00 | 7.87 | 7.51 | 7.04 | 6.63 | 6.47 | 6.63 | 7.04 | 7.51 | 7.87 | 8.00 |
| 0.25 | 8.00 | 7.81 | 7.28 | 6.56 | 5.92 | 5.66 | 5.92 | 6.56 | 7.28 | 7.81 | 8.00 |
| 0.30 | 8.00 | 7.75 | 7.04 | 6.05 | 5.11 | 4.70 | 5.11 | 6.05 | 7.04 | 7.75 | 8.00 |
| 0.35 | 8.00 | 7.69 | 6.82 | 5.54 | 4.25 | 3.63 | 4.25 | 5.54 | 6.82 | 7.69 | 8.00 |
| 0.40 | 8.00 | 7.65 | 6.63 | 5.11 | 3.41 | 2.47 | 3.41 | 5.11 | 6.63 | 7.65 | 8.00 |
| 0.45 | 8.00 | 7.62 | 6.51 | 4.81 | 2.74 | 1.25 | 2.74 | 4.81 | 5.51 | 7.62 | 8.00 |
| 0.50 | 8.00 | 7.61 | 6.47 | 4.70 | 2.47 | 0.00 | 2.47 | 4.70 | 6.47 | 7.61 | 8.00 |

Y AS $(1*WHT_{0,0}+1*WHT_{0,1}+1*WHT_{0,2}+1*WHT_{0,3}+1*WHT_{1,0}+1*WHT_{1,3})$ VS. $f_h$ AND $f_v$

| Y | 0.00 | 0.05 | 0.10 | 0.15 | 0.20 | 0.25 | 0.30 | 0.35 | 0.40 | 0.45 | 0.50 |
|---|---|---|---|---|---|---|---|---|---|---|---|
| 0.00 | 8.00 | 8.05 | 8.19 | 8.39 | 8.59 | 8.72 | 8.72 | 8.57 | 8.32 | 8.09 | 8.00 |
| 0.05 | 8.02 | 8.06 | 8.16 | 8.32 | 8.49 | 8.61 | 8.62 | 8.50 | 8.28 | 8.08 | 8.00 |
| 0.10 | 8.09 | 8.09 | 8.10 | 8.13 | 8.21 | 8.29 | 8.33 | 8.28 | 8.17 | 8.05 | 8.00 |
| 0.15 | 8.20 | 8.14 | 7.99 | 7.83 | 7.75 | 7.77 | 7.85 | 7.94 | 7.99 | 8.00 | 8.00 |
| 0.20 | 8.34 | 8.20 | 7.85 | 7.43 | 7.12 | 7.05 | 7.21 | 7.49 | 7.76 | 7.94 | 8.00 |
| 0.25 | 8.49 | 8.27 | 7.69 | 6.96 | 6.36 | 6.16 | 6.43 | 6.95 | 7.49 | 7.87 | 8.00 |
| 0.30 | 8.63 | 8.34 | 7.53 | 6.45 | 5.49 | 5.12 | 5.53 | 6.37 | 7.21 | 7.79 | 8.00 |
| 0.35 | 8.76 | 8.40 | 7.39 | 5.96 | 4.57 | 3.96 | 4.57 | 5.80 | 6.95 | 7.73 | 8.00 |
| 0.40 | 8.86 | 8.44 | 7.27 | 5.54 | 3.67 | 2.69 | 3.64 | 5.30 | 6.74 | 7.68 | 8.00 |
| 0.45 | 8.92 | 8.48 | 7.19 | 5.25 | 2.96 | 1.36 | 2.89 | 4.95 | 6.60 | 7.64 | 8.00 |
| 0.50 | 8.94 | 8.49 | 7.17 | 5.15 | 2.67 | 0.00 | 2.58 | 4.82 | 6.55 | 7.63 | 8.00 |

Y AS $(WHT_{0,0}+1.125*WHT_{0,1}+1.25*WHT_{0,2}+WHT_{0,3}+1.25*WHT_{1,0}+WHT_{1,3})$ VS. $f_h$ AND $f_v$

DIGITAL DECODER AND METHOD FOR DECODING COMPOSITE VIDEO SIGNALS

FIELD OF THE INVENTION

The invention relates to a digital decoder for composite video signals and to a method for the digital decoding of video signals having a brightness signal and two color difference signals, which modulate a color subcarrier according to the quadrature amplitude modulation principle (NTSC/PAL).

BACKGROUND OF THE INVENTION

Color video signals, so-called composite video, blanking and sync signals (CVBS), are essentially composed of a brightness signal or a luminance component (Y), two color difference signals or chrominance components (U, V or I, Q), vertical and horizontal sync signals (VS, HS) and a blanking signal (BL). The structure of a composite video signal (CVBS) and the corresponding Y, U and V signals are shown in FIG. 1.

FIG. 1a shows a composite video signal for an EBU (European Broadcasting Union) color bar test signal, with the six hue (tint) values belonging to the vertical color bar being additively superimposed in "carrier packets" with color carrier frequency on the luminance component Y. For color carrier generation, a color subcarrier frequency sync pulse, the burst, is transmitted directly behind the line sync pulse, SYNC. The burst phase and the burst amplitude serve as reference values for determining the hue and color saturation of the demodulated signal, which is represented by the individual carrier packets.

The different coding processes NTSC, PAL and SECAM introduced in the known color television standards, differ in the manner of chrominance transmission and in particular the different systems use different color subcarrier frequencies and different line frequencies.

In digital video signal processing and decoding the prior art fundamentally distinguishes between two system architectures. These are the burst-locked architecture and the line-locked architecture; i.e., systems which in each case operate with sampling frequencies for the video signal, which are produced in phase-locked manner to the color subcarrier frequency transmitted with the burst pulse or in phase-locked manner with the line frequency, respectively.

In the case of decoders with a burst-locked architecture, the sampling frequency is chosen in such a way that on the one hand, it is not too high so as to keep the power losses low, and on the other hand, it fulfills the Nyquist theorem; i.e., $f_a > 2 \cdot fsc$ (sampling frequency>2·chrominance subcarrier frequency). For a problem-free processing of the modulated color carrier in the decoder, it is appropriate to have a sampling frequency, which corresponds to an even multiple of the color subcarrier.

For line-locked architectures, the clock of the digital system is derived from the line frequency and is an integral multiple of the line frequency, so that an integral number of pixels are produced per line.

Although the burst-locked system has advantages with respect to the minimum effort and expenditure for color decoding, from other standpoints, this system has important disadvantages; e.g., in the case of horizontal and vertical synchronization, as well as in multistandard and "non-standard" uses. As the sampling process is essentially non-orthogonal, the burst-locked system is only suitable for the direct representation of images on a screen, but not for producing data for fixed raster applications; e.g., for field or frame stores or for frame grabbers in a PC environment.

Line-locked systems are admittedly suitable for frame, line and field storage purposes, as well as for digital video image processing in multistandard operation, but they give rise to new problems. In particular, much more complex color decoders are required, the analog clock generation requires high circuitry expenditure and the requirements regarding the maximum acceptable dynamic non-linearities of the A/D converter and the preceding analog signal processing stages are very high.

In the case of the prior art digital video signal decoders, no matter whether they operate according to the burst-locked or line-locked principle, the functional elements of the block circuit diagram of the decoder, such as the separating circuit for the luminance/chrominance signal, band-pass filters, control and setting elements and FM demodulators for the color difference signals are realized in separate functional blocks and are also found again in this form. Account is taken of the fact that redundancies occur with respect to similar tasks for the same partial functions by essentially directly converting the block circuit diagram.

Signal processing takes place either directly in the time or pixel domain or following a corresponding transformation of the digitized video signal in the frequency domain, the decoded signal then being transformed back into the time or pixel domain. For transforming the video signal from the pixel domain into the frequency domain, in the case of prior art digital decoders use is generally made of Fourier transformation or discrete cosine transformation, the latter having the advantage that it requires fewer multipliers than Fourier transformation. Up to now, the realization of such digital video signal decoders has involved a relatively high circuit expenditure. In particular, the multipliers needed for the transformation increase the costs for producing the digital decoder in an IC to a considerable extent.

The problem of the invention is to provide a decoder for digital video signals and a method for digitally decoding a composite video signal, which can be realized with reduced circuitry and computing expenditure than in the hitherto known decoders and methods.

SUMMARY OF INVENTION

This invention provides a method and apparatus of decoding. The invention therefore relates to a method for digitally decoding composite video signals (CVBS), comprising a brightness signal (luminance component Y) and two color difference signals (chrominance components U, V), which modulate a color subcarrier according to the quadrature amplitude modulation principle, in which; a plurality (N) of sample values of the video signal are transformed by means of a Walsh-Hadamard transformation (WHT) from the pixel domain into the WHT domain; the color difference signals (U, V) are derived as specific WHT coefficients of the WHT matrix obtained; the WHT coefficients determining the color difference signals (U, V) are subtracted from the WHT matrix; the WHT matrix is transformed back into the pixel range by means of an inverse Walsh-Hadamard transformation (IWHT); and the brightness signal (Y) is derived from the IWHT result.

According to an embodiment of the process according to the invention the sample values of the video signal are delayed by one line, each of N sample values of the actual line and N sample values of the delayed line are transformed by means of a vertical WHT and the resulting WHT coefficients are transformed by means of a horizontal WHT. It is advantageous if N sample values of the delayed line are added to corresponding N sample values of the actual line in order to form a low-pass filter and said N sample values of the delayed line are subtracted from said N sample values of the actual line in order to form a high-pass filter and the vertical sum and difference values are used as input values for the horizontal WHT.

According to a preferred embodiment of a decoder according to the invention the video signal is digitized at a sampling frequency of four times the color subcarrier frequency (4·fsc), so that in the case of PAL video signals 1135 sample values per line are produced and in the case of NTSC video signals 910 sample values per line are produced.

It is particularly advantageous if N=4 or N=8.

Furthermore, the resulting WHT matrix can be multiplied with a control and setting matrix.

According to an embodiment of the invention, the least significant IWHT coefficient ($WHT_{0,0}$) of the WHT matrix is used for deriving the line sync pulse of the video signal.

In addition, in the method according to the invention, for reducing noise, suppression takes place of low order WHT coefficients, $WHT_{x,y} \ll WHT$ mean.

Finally, for reducing quantization noise higher order WHT coefficients can be reproduced with a lower precision (resolution) than low order WHT coefficients.

The invention also relates to a digital decoder for composite video signals (CVBS), comprising a brightness signal (luminance component Y) and two color difference signals (chrominance components U, V), having; a transformation means, which transforms a plurality (N) of sample values of the video signal by means of a Walsh-Hadamard transformation (WHT) from the pixel domain into the WHT domain; a setting means, which multiplies the WHT coefficients of the resulting WHT matrix with control and setting parameters, the setting means having an output for deriving specific WHT coefficients as color difference signals (U,V); and an inverse transformation means, which transforms back the remaining WHT coefficients of the WHT matrix by means of an inverse Walsh-Hadamard transformation (IWHT) into the pixel domain and outputs same as the brightness signal (Y).

In the case of the decoder according to the invention, the transformation means preferably comprises a vertical and a horizontal WHT means connected in series.

According to a preferred embodiment of the invention, the vertical transformation means has; a delay means, which delays the sample values of the video signal by one line; an adder, which adds the N delayed sample values to corresponding N sample values of the actual line in order to form a low-pass filter; a subtracter, which subtracts the N delayed sample values from the N sample values of the actual line in order to form a high-pass filter; and a multiplexer, in order to selectively output the vertical sum and difference values as input values for the horizontal transformation means.

According to a preferred embodiment of the invention, the horizontal transformation means has an adder network, which performs the following operation:

$$F(u,v,t) = \sum_{x=0}^{N-1} f(x,t)\Phi_{u,v}(x)$$

in which F(u,v,t) are the transformed coefficients in the WHT domain, f(x,t) are the sample values in the pixel domain and $\Phi_{u,v}$ is the Walsh-Hadamard transformation matrix.

In the decoder according to the invention preferably N=4.

According to an embodiment of the invention, the horizontal transformation means has eight adders, whereof in each case four are connected in parallel, the output signals of the first four adders serving as input signals of the second four adders, so that the following equation is fulfilled:

$$\begin{pmatrix} WHT_0 \\ WHT_1 \\ WHT_2 \\ WHT_3 \end{pmatrix} = \begin{pmatrix} +1 & +1 & +1 & +1 \\ +1 & +1 & -1 & -1 \\ +1 & -1 & -1 & +1 \\ +1 & -1 & +1 & -1 \end{pmatrix} \times \begin{pmatrix} f(1) \\ f(2) \\ f(3) \\ f(4) \end{pmatrix}$$

In the case of the decoder according to the invention, it is possible to provide an input sample rate converter, which converts the input sample values of the video signal (CVBS) digitized at a first predetermined clock frequency into desired sample values at a second virtual sampling frequency of four times the color subcarrier frequency (4·fsc).

The individual functions of the digital decoder can be expressed by means of matrixes. By multiplying these matrixes, it is possible to represent the entire function of the decoder in a product matrix, which can be realized by a circuit described hereinafter. The control and setting of the decoder parameters, such as brightness, contrast, color saturation, color intensity, etc. can then take place centrally, avoiding redundancies.

In the case of the digital decoding method and the digital decoder according to the invention, the sample video signal is transformed by means of a Walsh-Hadamard transformation (WHT) from the pixel domain into the WHT domain and the color difference signals and brightness signal are derived from the resulting WHT matrix. The WHT essentially functions as a set of filters, a specific pass band being in each case associated with the WHT matrix coefficients and with rising WHT order the band width of the individual filters decreases, but the number of filters correspondingly increases. The Walsh-Hadamard transformation also has the particular advantage of being exclusively realizable with adders. Under the assumption that the clock frequency of the digital decoder system is four times the color subcarrier frequency of a composite video signal (CVBS) of NTSC or PAL standards, the WHT provides a simple and suitable means for demodulating and decoding the chrominance information (U, V).

BRIEF DESCRIPTION OF THE DRAWINGS

The invention is described in greater detail hereinafter relative to a preferred, non-limitative embodiment with reference to the following drawings.

DETAILED DESCRIPTION OF INVENTION

Figure 1:
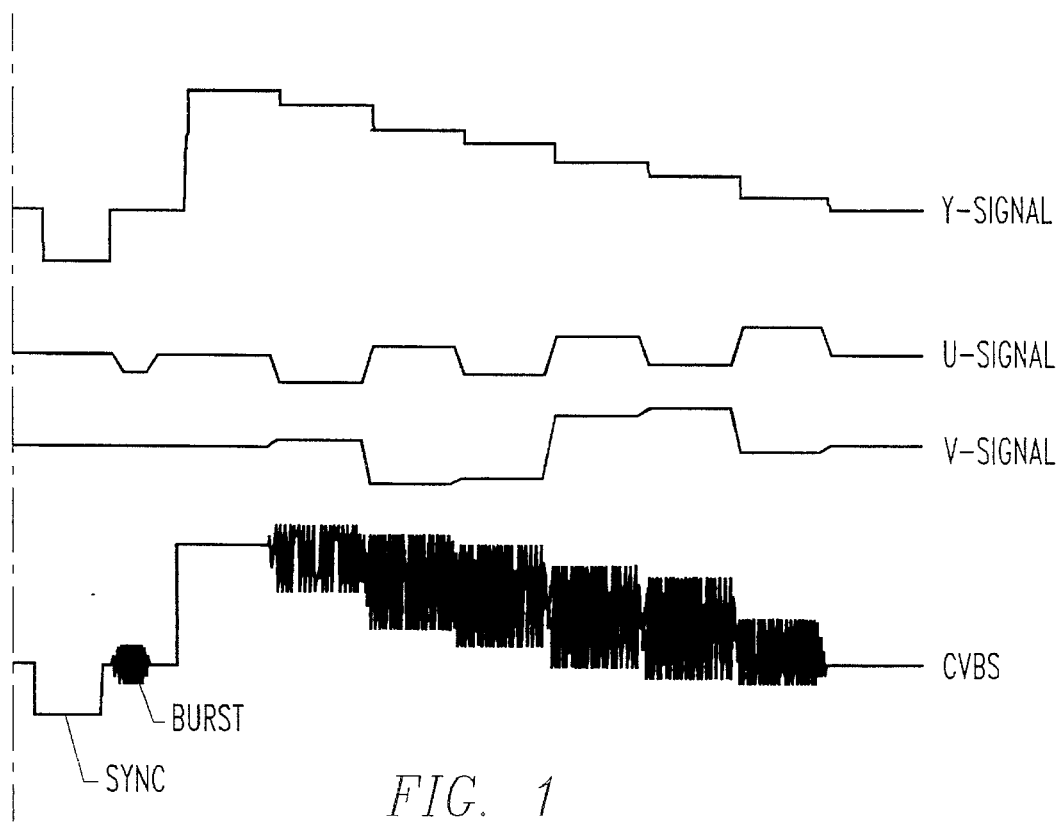
FIG. 1 A composite EBU color bar video signal (CVBS) and the corresponding Y, U and V signals.
Figure 2A:
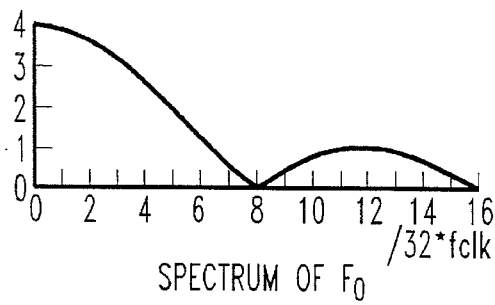
FIGS. 2a–2d The spectra of the transformation coefficients of a 1·4 WHT.
Figure 2B:
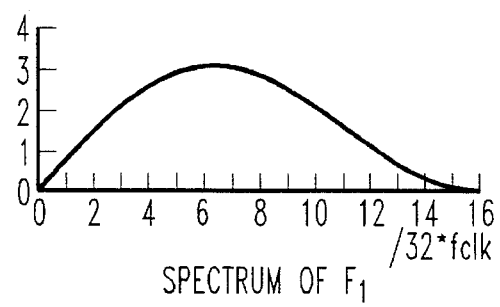
Figure 2C:
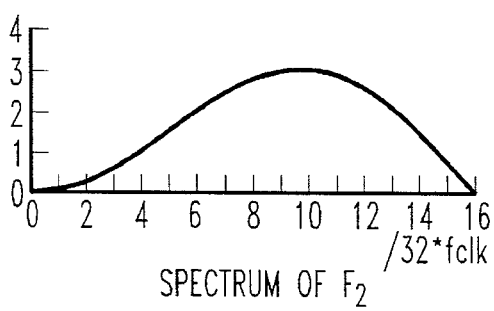
Figure 2D:
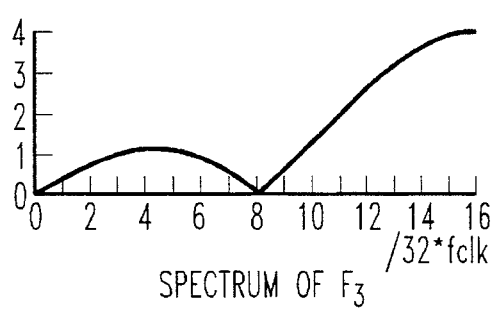
Figure 3A:
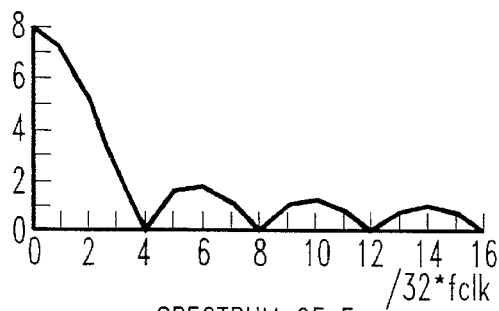
FIGS. 3a–3h The spectra of the transformation coefficients of a 1·8 WHT.
Figure 3B:
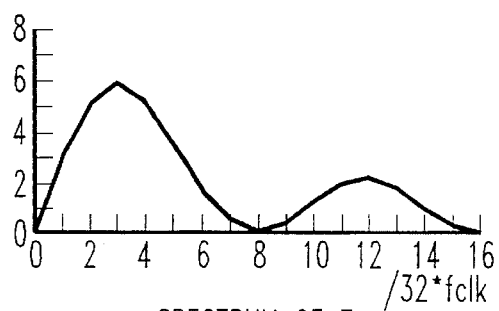
Figure 3C:
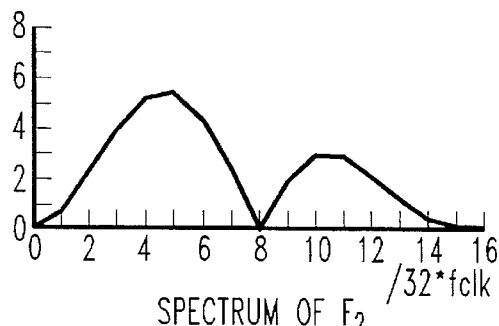
Figure 3D:
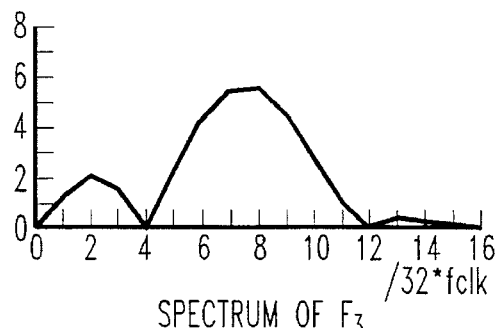
Figure 3E:
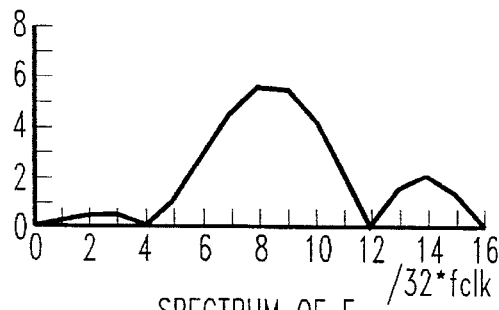
Figure 3F:
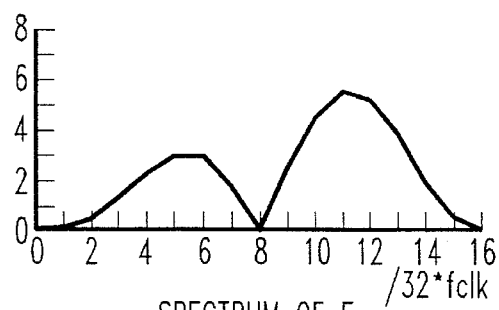
Figure 3G:
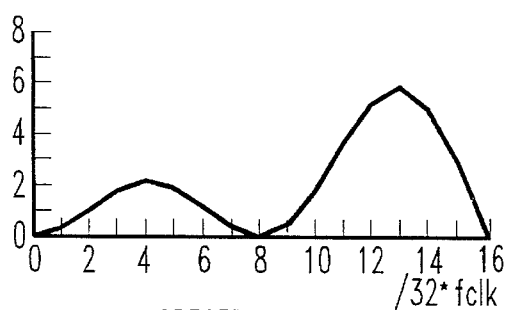
Figure 3H:
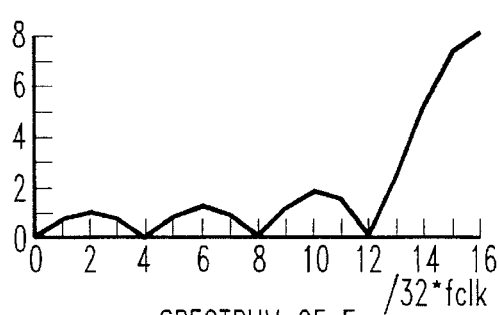

The basic principles of the Walsh-Hadamard transformation will firstly be described. In the same way as the discrete Fourier transformation (DFT), the discrete cosine transformation (DCT) and the Karhunen-Loève transformation. The Walsh-Hadamard transformation (WHT) belongs to the class of lossless, orthogonal unitary transformations. In this class, WHT is the simplest form of a transformation. WHT ($T_{WHT}$) is a square matrix of +1 and −1, whose lines and columns are orthogonal. Thus, the following applies:

$$T_{WHT} = T_{WHT}^t = T_{WHT}^{-1} \qquad \text{Eq. 1}$$

The least significant WHT matrix is of order basis two and is in the following form:

$$H_2 = \begin{bmatrix} 1 & 1 \\ 1 & -1 \end{bmatrix} \qquad \text{Eq. 2}$$

The higher order WHT matrixes are obtained from the Kronecker product of $H_2 \otimes H_2$:

$$H_{4n} = \begin{bmatrix} H & H \\ H & -H \end{bmatrix} \qquad \text{Eq. 3}$$

The WHT fulfills equations 4 and 5 (inverse transformation) an example of a 4×4 WHT being given in equation 6.

$$F(u,v,t) = \sum_{x=0}^{M-1} \sum_{y=0}^{N-1} f(x,y,t) \cdot \Phi_{u,v}(x,y) \qquad \text{Eq. 4}$$

$$f(x,y,t) = \sum_{u=0}^{M-1} \sum_{v=0}^{N-1} F(u,v,t) \cdot \Phi_{x,y}(u,v) \qquad \text{Eq. 5}$$

in which F(u,v,t) are the transformed coefficients in the WHT domain, f(x,y,t) the sample values in the pixel domain, $\Phi_{u,v}$ and $\Phi_{x,y}$ are the Walsh-Hadamard transformation matrixes and N, M rows and columns of 2-dimensional fields:

$$\Phi_{u,v} = \Phi_{x,y}\Phi_{x,y} = \begin{bmatrix} +1 & +1 & +1 & +1 \\ +1 & +1 & -1 & -1 \\ +1 & -1 & -1 & +1 \\ +1 & -1 & +1 & -1 \end{bmatrix} \qquad \text{Eq. 6}$$

The transformation coefficients appear as sampled values of a set of filters, the bandwidth of the resulting filters decreasing with an increase in the WHT basis and there is a corresponding increase in the number of filters. The least and most significant transformation coefficients correspond to the values of a low and a high-pass filter.

FIGS. 2 and 3 show the spectrum of the individual transformation F(u,v,t).

FIGS. 2a to 2d show the transformation coefficients as sampled values of a low-pass filter (FIG. 2a), two band-pass filters (FIGS. 2b and 2c) and a high-pass filter (FIG. 2d) for a 1×4 WHT. (The scaling of the x-axis corresponds to $n/32 * f_{clk}$).

FIG. 3 shows the transformation coefficients for a 1×8 WHT. The comparison between FIGS. 2a to 2d and FIGS. 3a to 3h show that the bandwidth of the resulting filters decreases with an increase in the WHT order, whereas there is a corresponding increase in the number of filters.

The nature of the Walsh-Hadamard transformation, which only comprises basic functions exclusively built up from +1 and −1, results in a simple and multiplier-less structure, which can easily be implemented in ICs. In this connection, it is pointed out that the sample rate of the individual WHT coefficients decreases as a function of 1/x of the basis of the WHT. Thus, if the basis of the WHT is increased by x, the necessary computing capacity only increases by $\log_2(x)$.

Figure 4:
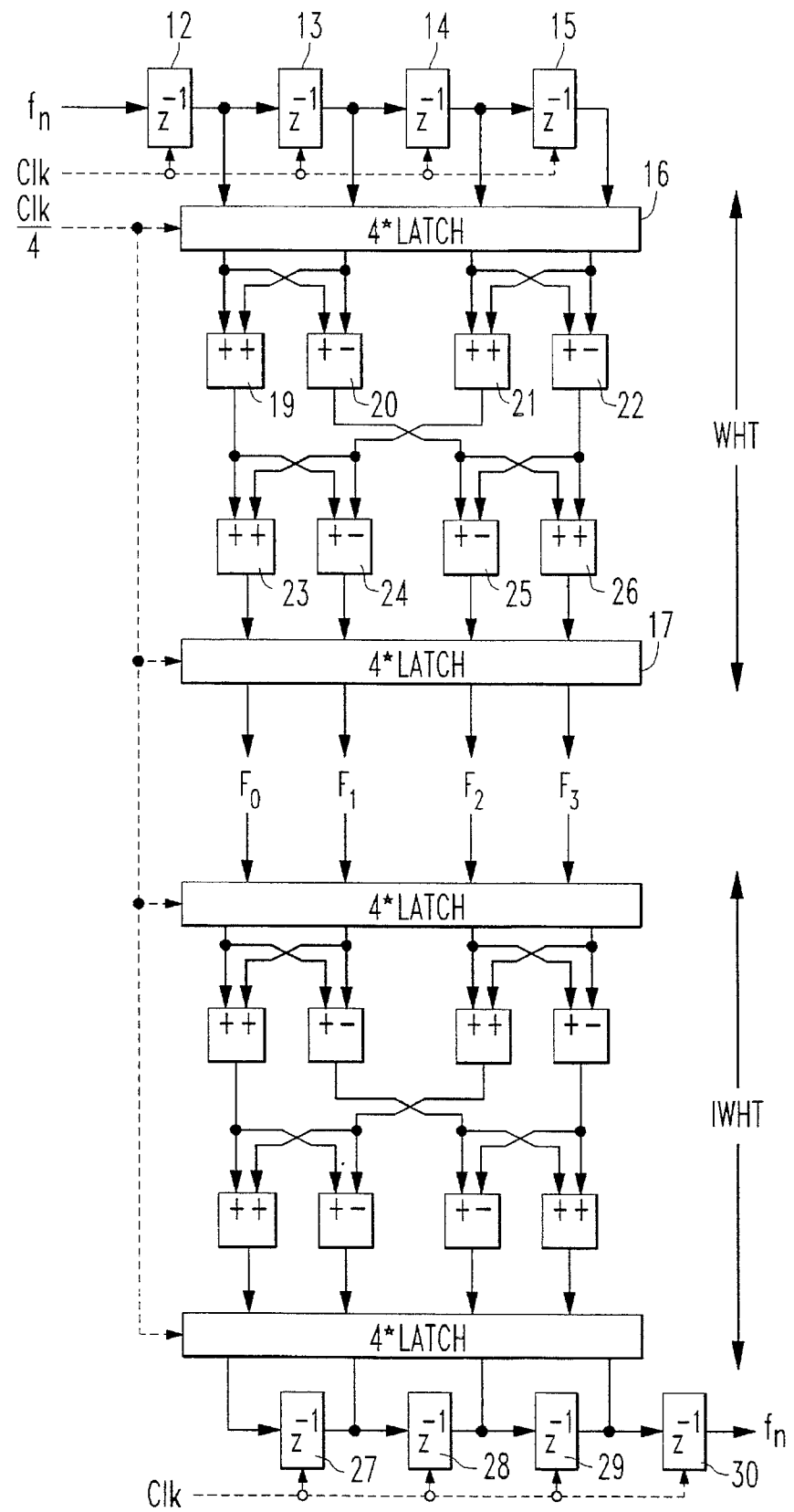
FIG. 4 The circuit diagram of a 1·4 WHT and a 1·4 IWHT.

As the multidimensional Walsh-Hadamard transformation and its inverses, IWHT, can be completely separated into a cascade of one-dimensional WHTs (IWHTs), the basic structure shown in FIG. 4 can be separately used for the horizontal and vertical WHT (IWHT). The represented example of a 1×4 WHT and 1×4 IWHT requires adders and subtracters with only two inputs and it is easy to reduce or increase the WHT order.

The circuit shown in FIG. 4 for realizing a 1×4 WHT comprises four delay elements 12, 13, 14, 15, two latches 16, 17 and eight adders or subtracters 19 to 26. The sampled video signal in the time or pixel range is inputted as input sample values $f_n$ is delayed by one clock period (CLK) in each delay element and outputted at the latch 16. The latter outputs in parallel four delayed signal values $f_1$ to $f_4$ with a clock frequency of CLK/4 to the adders or subtracters 19 to 26 respectively. The adders are interconnected in the manner shown in FIG. 4 and into one adder 19 or 21 and one subtracter 20 or 22 are inputted the first two or the second two delayed signal values. The output signals of the first four adders 19 or 22 are used as input signals for the second row of adders or subtracters 23 to 26. The output signal of the first adder 19 is inputted into the adder 23 and the subtracter 24, the output signal of the subtracter 20 is inputted into the subtracter 25 and the adder 26, the output signal of the adder 21 is inputted into the adder 23 and the subtracter 24 and the output signal of the subtracter 22 is inputted into the subtracter 25 and the adder 26. The output signals of the adders 23 to 26 are transferred to the latch 17, from where they can be read out in parallel as transformation coefficients $f_0$, $f_1$, $f_2$ and $f_3$. The adding circuit for a 1×4 WHT shown in FIG. 4 fulfills the following equation:

$$\begin{pmatrix} F_0 \\ F_1 \\ F_2 \\ F_3 \end{pmatrix} = \begin{pmatrix} WHT_0 \\ WHT_1 \\ WHT_2 \\ WHT_3 \end{pmatrix} = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \times \begin{pmatrix} f_1 \\ f_2 \\ f_3 \\ f_4 \end{pmatrix} \qquad \text{Eq. 7}$$

The circuit for the inverse Walsh-Hadamard transformation (IWHT) is identical to the described circuit, because WHT=IWHT, but the delay elements 27 to 30 are located at the output and not the input of said circuit.

Figure 5:
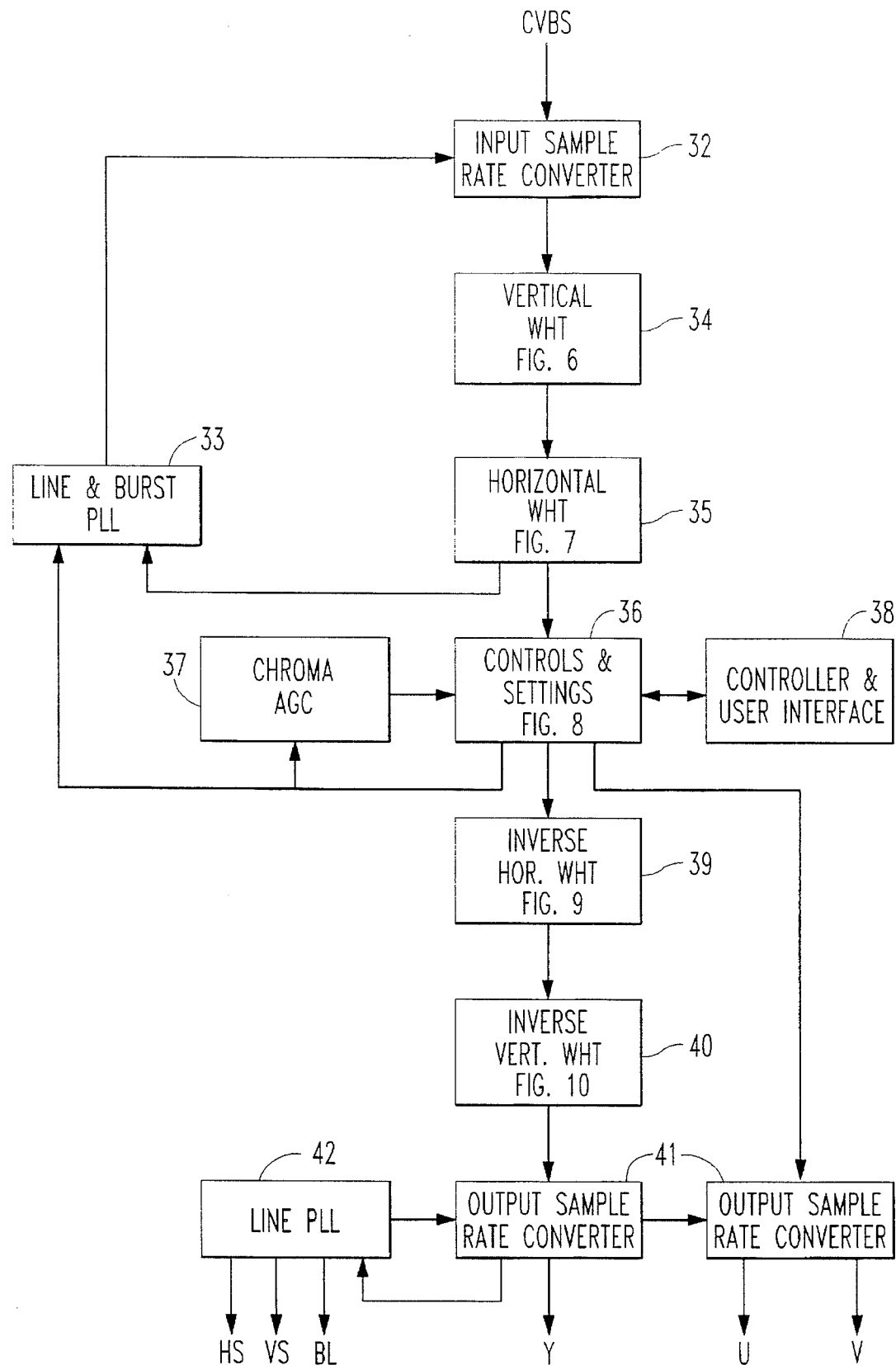
FIG. 5 A block circuit diagram of a preferred embodiment of the digital decoder according to the invention.

FIG. 5 shows the block circuit diagram of a preferred embodiment of the digital decoder according to the invention. The digital decoder comprises an input sample rate converter (SRC) 32, a line and burst phase-locked loop (line & burst PLL) 33, a vertical WHT circuit 34 and a horizontal WHT circuit 35, a control and setting circuit (controls and settings) 36, a chroma automatic gain control circuit 37 (Chroma AGC), a controller and user interface 38, a horizontal IWHT circuit 39 and a vertical IWHT circuit 40, an output sample rate converter 41 and a line phase-locked loop (line PLL) 42.

A sample rate converter which is particularly advantageous if the inventive decoder is to be used as a multistandard decoder for different video signal standards, is described in the parallel application of the same applicant filed on Jun. 30, 1995 Ser. No. 08/497,181 entitled "Sample Rate Converter Method and Apparatus for Converting Sample Values of a Signal from One Frequency to a Second Sample Frequency", which is incorporated herein by reference.

A particularly advantageous solution for a line and burst phase-lock loop is described in the parallel application of the same applicant and having the same application date entitled "Multistandard Decoder for Video Signals and Method for Video Signal Decoding", which also is incorporated herein by reference.

The composite video signal (CVBS) digitized at the clock frequency of a host system, such as a computer, is inputted into the input sample rate converter 32. The line and burst PLL 33 controls the input sample rate converter 32 in such a way that the input video signal digitized with the predetermined clock frequency is converted into a signal with sample values at a determined clock frequency is converted into a signal with sample values at a second virtual sampling frequency, which is four times the color subcarrier frequency. By choosing the "virtual" sampling frequency as four times the color subcarrier frequency on the one hand the Shannon-Nyquist theorem ($f_a > 2 \cdot f_{sc}$) is fulfilled and on the other there is an integer number of sample values per video line, namely 910 sample values per line for a NTSC signal and 1135 sample values per line for a PAL signal. This makes it possible to combine the advantages of a burst-locked architecture, in which the sample signal is an even multiple of the color subcarrier frequency with the advantages of the line-locked architecture, in which the sampling frequency is an integermultiple of the line frequency.

In an alternative embodiment the clock frequency of the digital decoder can be directly set to four times the color subcarrier frequency of the input video signal and the video signal is then directly digitized with this decoder clock frequency, so that a sample rate conversion is not necessary.

The sampled values of the composite video signal (CVBS) are then passed onto the vertical WHT circuit 34, whose output supplies the input signals for the following horizontal WHT circuit 35. Both circuits are described in greater detail hereinafter.

The vertical WHT circuit essentially forms a vertical low-pass filter and a vertical high-pass filter two corresponding sample values of two video image lines being added and subtracted respectively. In the horizontal WHT circuit, the high and low-pass filtered sample values, in each case two lines are transformed in alternating manner into the WHT range by means of Walsh-Hadamard transformation. The resulting WHT matrix is then inputted into the control and setting circuit 36, in which on the one hand the chrominance signal components U and V are separated from the luminance signal component Y and on the other all the controls and settings of the signal are centrally performed in said circuit, in the manner described hereinafter.

The WHT matrix from which the chrominance signal components have been separated, is then transformed back into the pixel range by the horizontal IWHT circuit 39 and the vertical IWHT circuit 40 and the decoded video signal components U, V and Y, optionally following an output sample rate conversion by the output sample rate converter 41, are outputted by the digital decoder.

Figure 6:
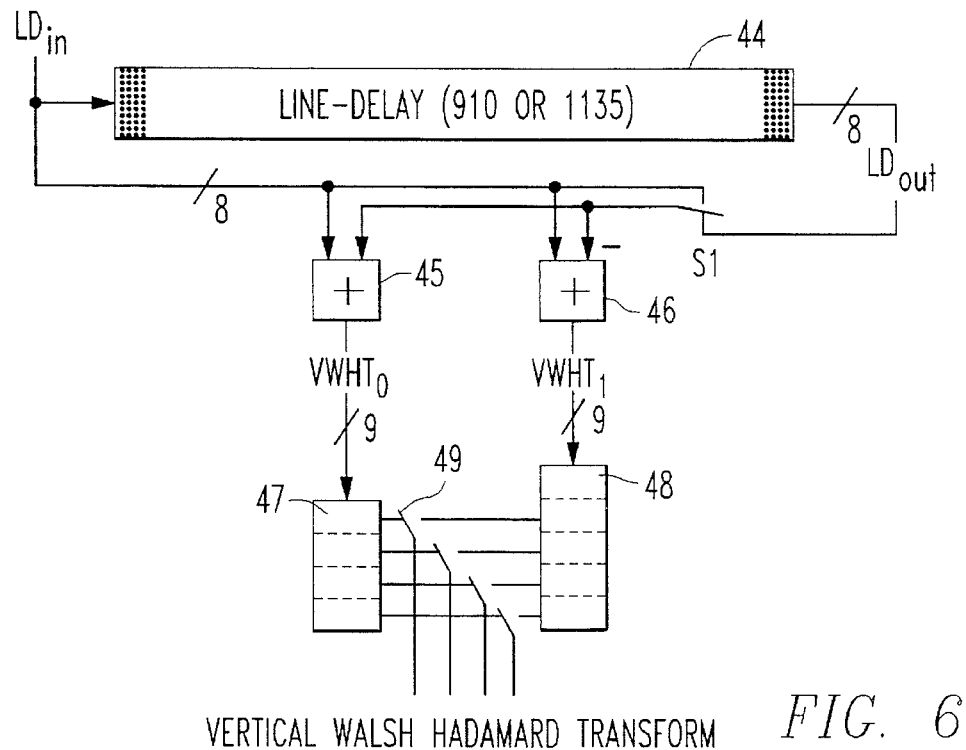
FIG. 6 A circuit diagram for realizing the vertical WHT for the decoder of FIG. 5.

The structure and function of the individual circuit parts of the digital decoder of FIG. 5 are described hereinafter. FIG. 6 shows the structure of the vertical WHT circuit 34 of FIG. 5, which comprises the line delay means 44, two adders 45, 46, two register stacks 47, 48 and a multiplexer circuit 49. The line delay means 44 in each case stores one line of sample values of the video signal; i.e., 910 values for NTSC signals and 1135 values for PAL signals. As shown in FIG. 6, a vertical low-pass filter is formed, in that in each case two vertically aligned sample values, one from the actual video image line and one from the delayed image line, are added in the adder 45, while the subtraction of the same two sample values in the adder 46 provides a vertical high-pass filter. As explained hereinbefore, the vertical alignment requires a horizontal line delay. With a clock frequency of $4 \cdot f_{sc}$ the line delay device has 910 individual delay stages for NTSC signals and requires 1135 delay stages for PAL signals.

In each case, during the start up phase of the operation of a multistandard decoder, which can process video signals of different standards, it can occur that even if the correct standard (NTSC or PAL) has been detected and the correct number of delay elements selected, that the overall delay has still not been correctly set, because the virtual sampling frequency of the input sample rate converter 32 has not yet been precisely locked-in with the line sync pulse and the burst signal phase by the line and burst phase-locked loop 33. Until the sampling frequency has been correctly set, the line delay device is consequently by-passed by means of the switch S1 shown in FIG. 6.

Figure 7:
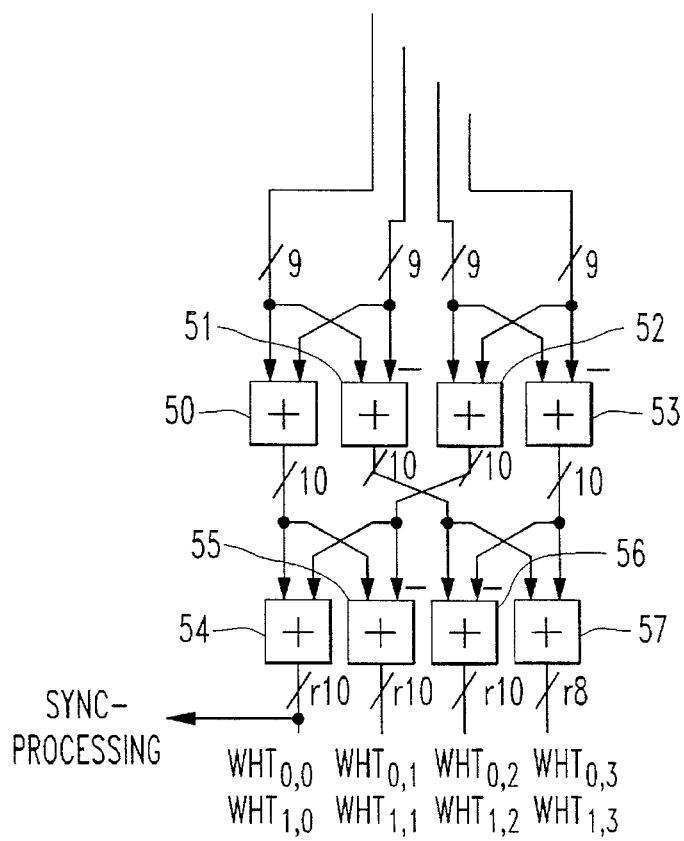
FIG. 7 A circuit diagram for realizing the horizontal WHT for the decoder of FIG. 5.

Two register stocks 47, 48 store the last four output values of the vertical low-pass filter 45 ($VWHT_0$) or the vertical high-pass filter 46 ($VWHT_1$), the register stocks 48 having an additional register compared with the buffer 47. The outputs of the registers of stocks 47 or 48 are then outputted in alternating parallel manner to the horizontal WHT circuit 35 by means of the multiplexer circuit 49 and as shown in FIG. 7. The horizontal WHT circuit of FIG. 7 comprises eight adders 50 to 57 and is constructed in the same way as the WHT circuit described with respect to FIG. 4, which satisfies equation 7.

The horizontal WHT circuit shown in FIG. 7 simultaneously derives its four input signals from the vertical WHT stage 34, the multiplexer circuit 39 alternately outputting the vertical low-passed output values $VWHT_0$ and the vertical high-passed output values $VWHT_1$. As a result, a single horizontal WHT stage performs the entire two-dimensional Walsh-Hadamard transformation, the vertical low-pass filtered elements and the vertical high-pass filtered elements being processed in the multiplex operation. Within each case one clock pulse the horizontal WHT circuit obtains the WHT coefficients $WHT_{0,0}$ to $WHT_{0,3}$ and with each second clock pulse, the WHT coefficients $WHT_{1,0}$ to $WHT_{1,3}$. As only one set of WHT coefficients is required for fulfilling the Nyquist theorem per eight clock cycles, the shown arrangement for the vertical and horizontal WHT's results in an oversampling of the WHT coefficients by a factor of 2, both in the vertical and horizontal direction.

This oversampling can also be looked upon as a half overlap of transformation windows, in both the vertical and horizontal direction. This overlap is particularly advantageous, because it automatically results in the desired output format of 4:2:2, without requiring a further interpolation or an inverse WHT for the color difference signals U and V. A two pixel overlap of WHT windows with a size of four pixels has proved to be the most favorable solutions, in which with minimum complexity the requirements regarding the bandwidth of the luminance and chrominance signal components are fulfilled and a satisfactory separation of the luminance and chrominance signal components is still ensured. The horizontal shift or displacement of two pixels from one window to the next gives a phase shift of 180° for $WHT_{0,1}$ and $WHT_{0,2}$, which can be compensated by a reversal of the inversion of these coefficients.

It is pointed out that each individual output coefficient of the Walsh-Hadamard transformation represents a linear combination of all the input sample values (pixels) for said WHT, so that a single WHT output coefficient cannot be associated with a specific input sample value. In fact, a set of WHT output coefficients represents the two-dimensional (spatial) spectrum of all the input sample values for a given block of a given size. As a result of the partial overlap of the transformation blocks, there is a partial redundancy of the WHT coefficients, which is taken into account in that only a subset of the possible output sample values of the inverse Walsh-Hadamard transformation is computed. As this subset of the output sample values of the IWHT is still a linear combination of all the WHT coefficients of a given transformation block, it reflects all the operations performed in the WHT range. The partial overlap of the blocks is also advantageous in that for the IWHT's the block edge regions can be ignored and only the central output sample values of a given block are calculated.

The WHT coefficient $WHT_{0,0}$ corresponds to a horizontally and vertically low-pass-filtered version of the composite input signal and therefore is suitable in optimum manner for the processing of the line sync signal of the video signal (sync processing). Thus, the WHT coefficient $WHT_{0,0}$ is for this purpose tapped at the output of the horizontal WHT circuit of FIG. 4.

In order to keep low the quantization noise both in the luminance channel and in the chrominance channels, the output values of the horizontal WHT stage is outputted with a quantization or resolution of 10 bits. However, for the same reason the quantization of the higher order WHT coefficients $WHT_{0,3}$ and $WHT_{1,3}$ are limited purposely to 8 bits.

The described 2×4 WHT and the corresponding 2×4 IWHT represent two-dimensional transformations with a block size of two rows and four columns. The input signal for the WHT is derived in the form of four successive pixels from in each case two successive horizontal lines. The WHT output coefficients represent the two-dimensional, spatial spectrum of all the input sample values for a given block of a given size.

FIGS. 11 to 18 show the spatial frequency response of the absolute gain function for the eight WHT output coefficients, which are derived from a 2×4 WHT. Each of these figures includes a table for in each case one WHT coefficient, the horizontal frequency ranging from d.c. (0, 00) up to half the sampling frequency (0, 50) and the vertical frequency ranging from d.c. (0, 00) to half the vertical sampling frequency (0, 50). The vertical sampling frequency is determined by the line structure of the image. For better visualization, additionally a three-dimensional plot of the frequency spectrum is shown.

Figure 11:
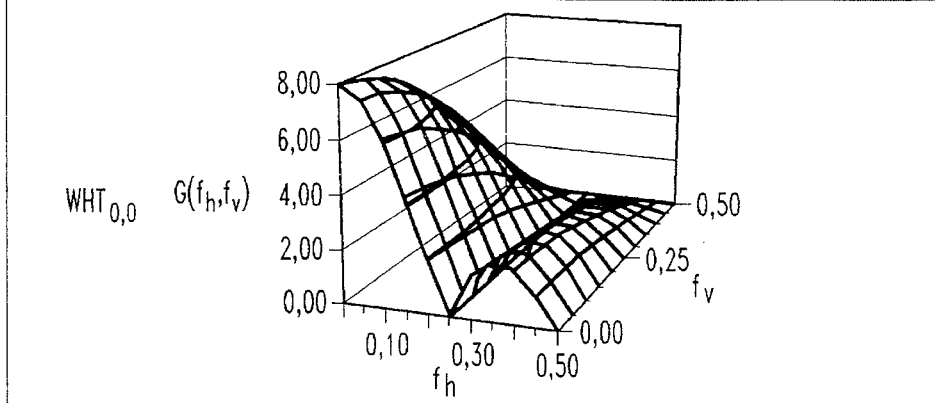
FIGS. 11 to 20 Graphs of the spatial frequency response of the individual WHT coefficients or chrominance and luminance components in the WHT range over the horizontal and vertical sampling frequency.
Figure 12:
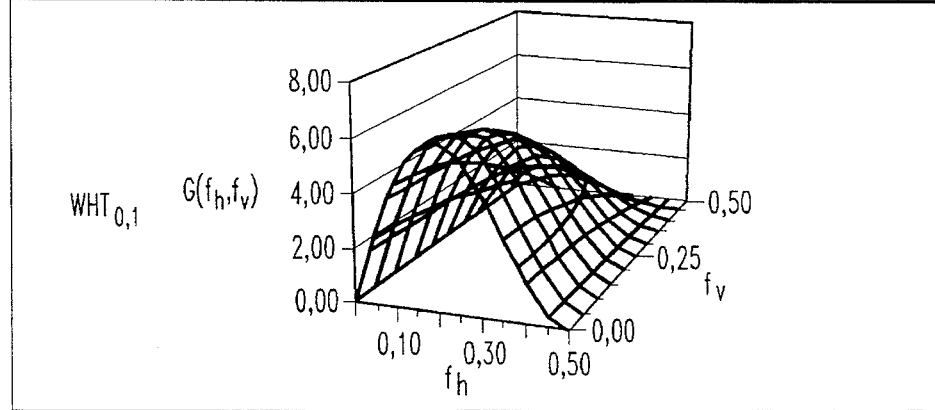
Figure 13:
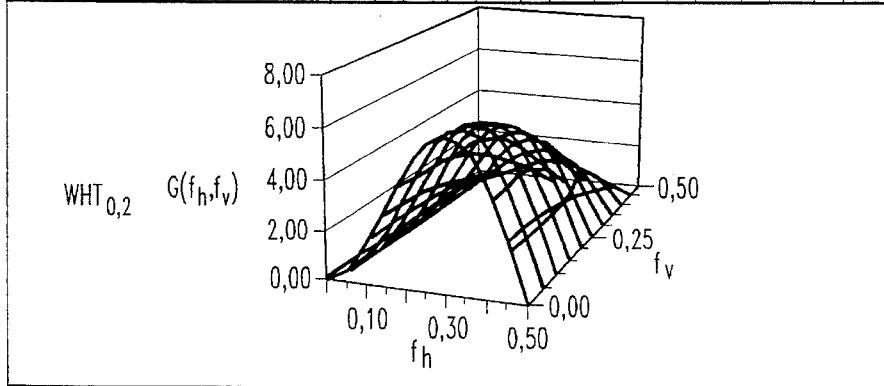
Figure 14:
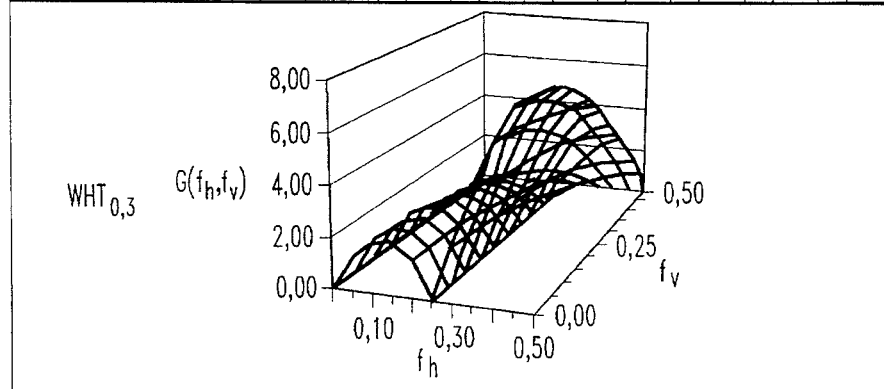
Figure 15:
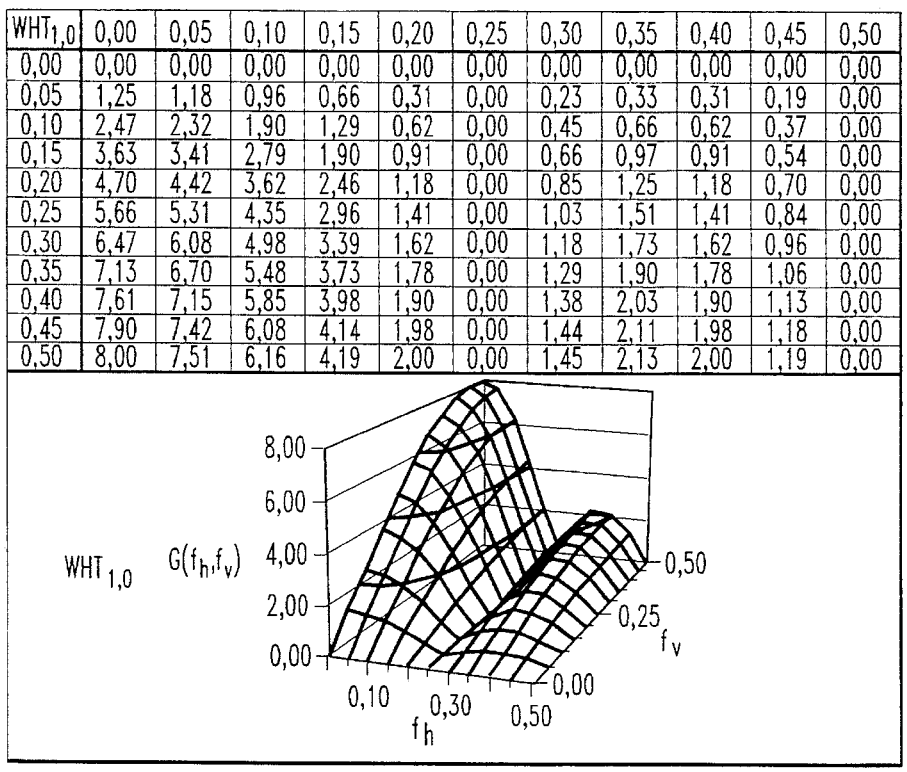

As expected, FIG. 11 shows the two-dimensional low-pass characteristic of the "d.c. coefficient" $WHT_{0,0}$, whereas FIGS. 12 to 18 show the band-pass characteristic of the corresponding "a.c. current coefficient" $WHT_{0,0,1}$ to $WHT_{1,3}$.

Figure 16:
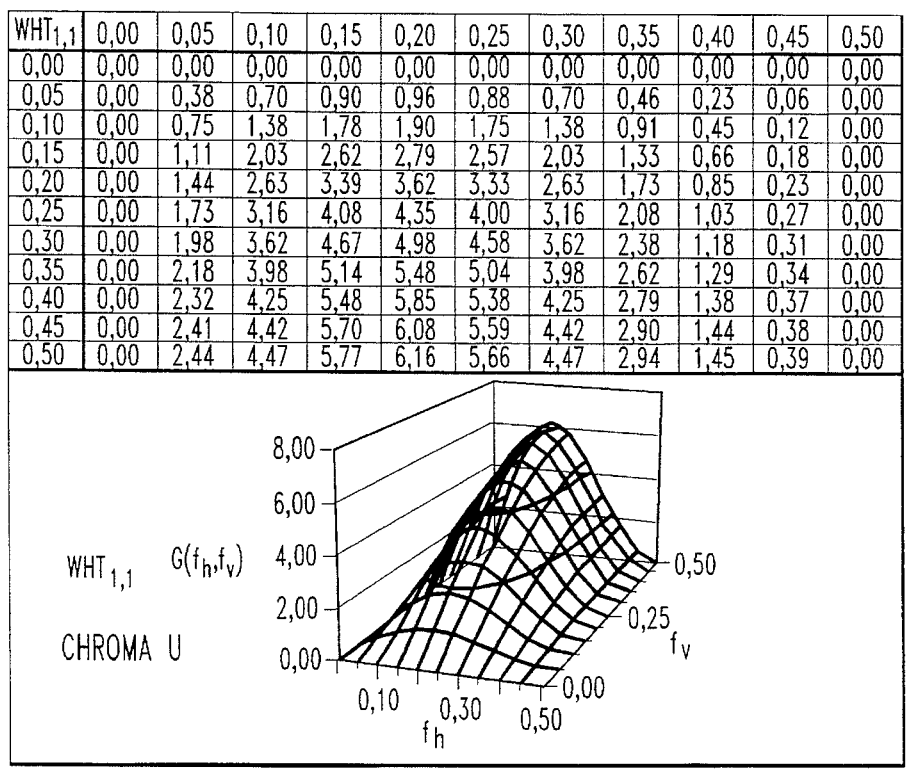
Figure 17:
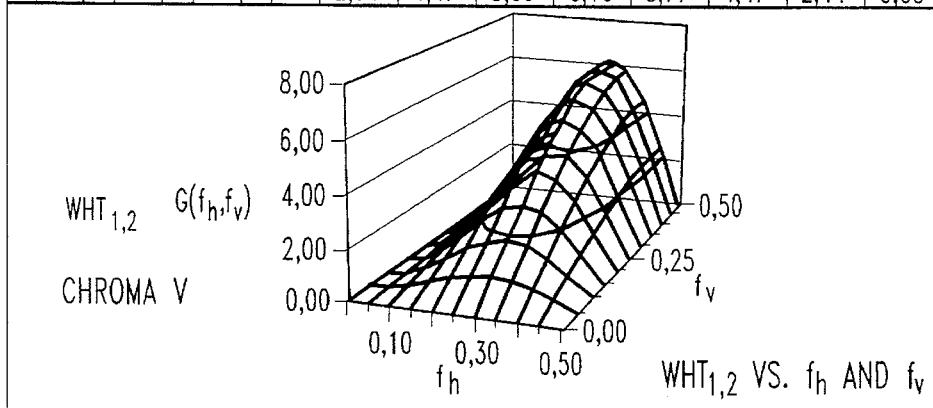
Figure 18:
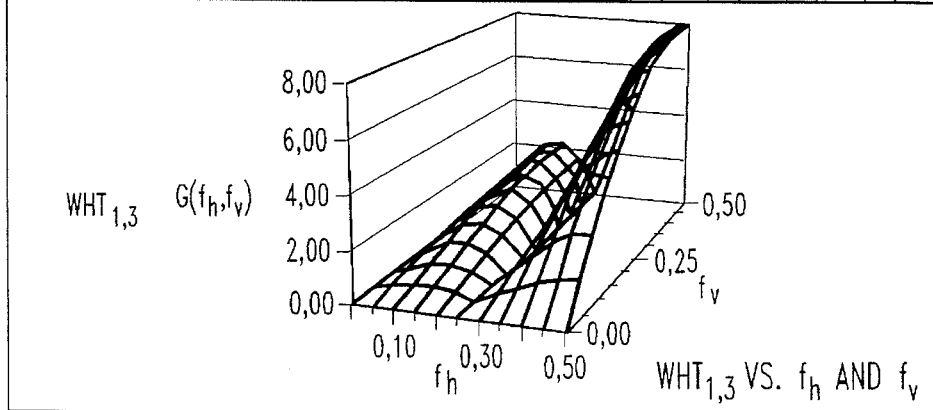
Figure 19:
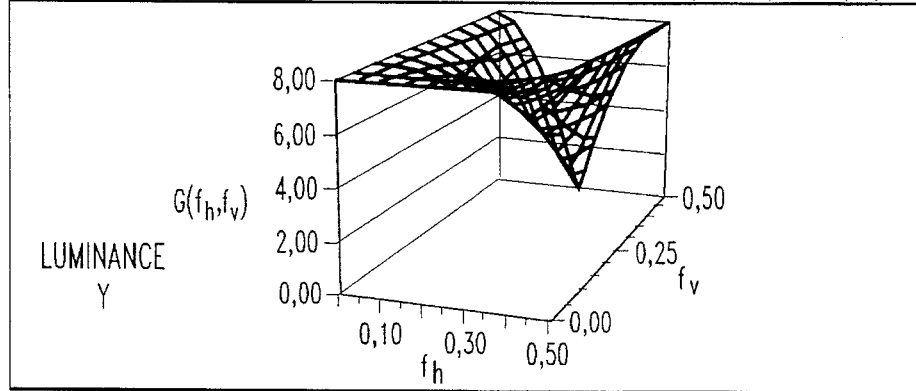

The use of inverse WHT (IWHT) on the entire set of unmodified WHT coefficients would return the original input sample values for the WHT, multiplied by a constant factor of 8 (2×4). The WHT coefficient $WHT_{1,1}$ of FIG. 16 can be extracted as the chrominance signal component U and the WHT coefficient $WHT_{1,2}$, of FIG. 17 can be extracted as the chrominance signal component V. FIGS. 16, 17 and 19 give the result for the individual chrominance signal components U and V, as well as the luminance component Y. Unlike in conventional TV decoders, FIG. 19 gives the complete horizontal and vertical bandwidth of the luminance signal component, but only the diagonal can be considered as the chrominance component.

Figure 20:
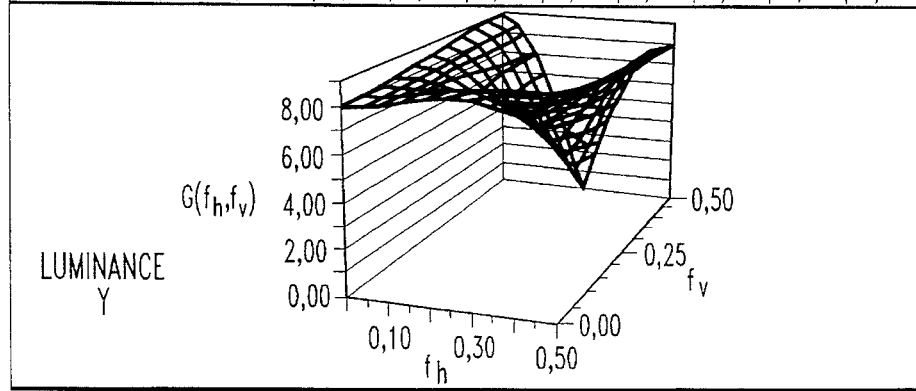

FIG. 20 shows the result if specific WHT coefficients are multiplied with different factors in order to obtain a horizontal and vertical peaking of contours (emphasizing/de-emphasizing of individual spectral components).

Figure 8:
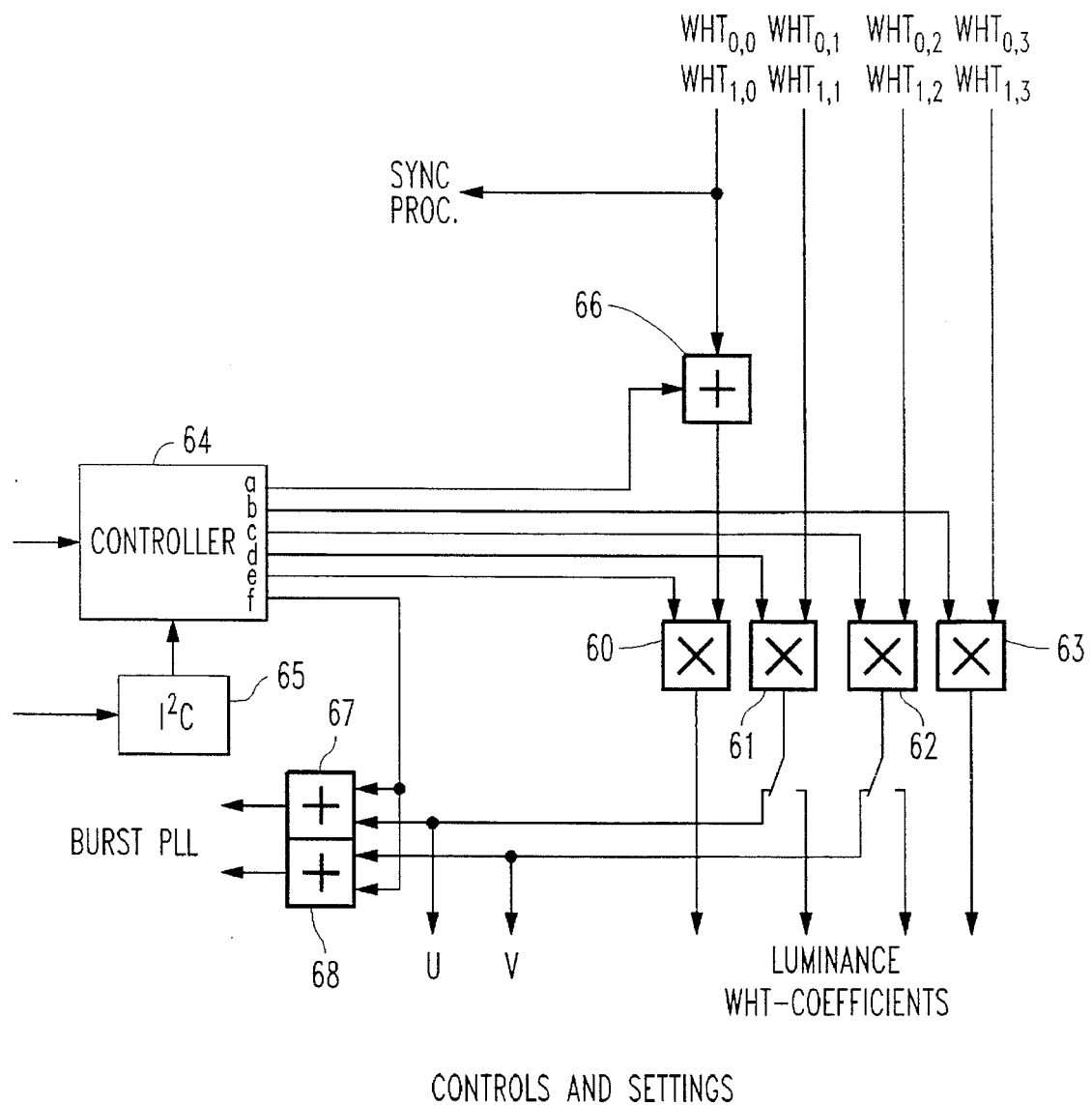
FIG. 8 A circuit diagram for realizing the control and setting of the decoder of FIG. 5.

The WHT output coefficients of the horizontal WHT circuit 35 are inputted into the control and setting circuit 36 shown in FIG. 8. This circuit has four multipliers 60, 63, which in the indicated manner are connected to a controller 64 and via an IC bus ($I^2C$) 65 to a user interface. At the output of the multipliers 60 to 63 are separately outputted the U and V chrominance signal components, corresponding to specific WHT coefficients, and the luminance WHT coefficients. In addition, as shown in FIG. 8, there are three adders 66 to 68 in the control and setting circuit 36.

Unlike in other known system architectures of digital decoders, the decoder according to the invention allows the concentration of all the control and setting functions in a single hardware stage. This concentration in conjunction with the above-described multiplex scheme permits an optimum utilization of a minimum number of multipliers.

For example, the following control and setting options can be provided:

| User Settings | System Controls |
| --- | --- |
| Brightness | Chroma Aut. Gain Control |
| Contrast | Hor. Sub-Sampling Prefilter |
| Hue/Tint | Vert. Sub-Sampling Prefilter |
| Hor. Peaking/Smoothing | Color Killer |
| Vert. Peaking/Smoothing | |

As neither the user settings, nor the system control require a very high speed, the processing of the relevant parameters can be left to a general purpose controller. In order to economize IC pins, the user interface can be realized by means of a two-wire IC bus ($I^2C$) or the like.

The control outputs a to e alternate between two states, whereas the controller output f is only dedicated to the hue function.

The brightness is controlled by means of the controller output a, which alternates between the setting values for the brightness ($a_0=-16 \ldots +15$) and the value $a_1 = 0$. Unlike in the pixel domain, where the brightness control is obtained by the addition of a variable value to each pixel value, the same function is realized in the WHT domain in that by means of an adder 66 a specific setting value (a0 or a1) is added to the "direct current" coefficients ($F_{0,0}$ or $WHT_{0,0}$) of a given block.

While a video image line is active, the contrast has an equal impact on $b_0$ to $e_0$ and $b_1$ to $e_1$, so that on changing the contract, the equilibrium between luminarice and chrominance is maintained. During the blanking intervals, the contrast is set to a nominal (neutral) value, in order not to disturb the chroma automatic gain control. Thus, much as in the pixel domain, the contract setting is achieved by multiplying each WHT value by a specific setting value.

While a video image line is active, the color saturation is controlled by means of the value $c_1$ and $d_1$, on which are superimposed the values for the chroma automatic gain control (−6 dB . . . +20 dB) and the color killer (0 or 1). During the blanking intervals, only the chroma automatic gain control (Chroma AGC) for the values $c_1$ and $d_1$ remains active. Thus, the color saturation control is brought about by multiplying the color difference values U and V, which are represented by the one WHT coefficient $WHT_{1,1}$ and $WHT_{1,2}$, respectively by a specific setting value for each block.

The function of the Chroma AGC 37, which cooperates with the control and setting circuit 36 (FIG. 5) is as follows. The Chroma AGC accumulates the absolute values of U and V or $WHT_{1,1}$, and $WHT_{1,2}$ during the burst gate pulse and outputs the result to the controller. The controller corrects the multiplication factors for $WHT_{1,1}$, and $WHT_{1,2}$ in such a way that the Chroma AGC stage output becomes equal to the user setting for the color saturation. A color killer (Coki) is additionally set under one of the three following conditions:

a) If the line and burst phase-locked loop 33 is not synchronous to the color subcarrier frequency and/or line frequency of the video signal (PLL unlocked), b) if U has the incorrect sign, or c) if the amplitude of the color subcarrier signal is too small.

As the control output f is only dedicated to the setting of the hue, there is no need to distinguish between $f_0$ and $f_1$. As in the pixel domain, the control is achieved in that of the adders, 67 and 68, for the color subcarrier PLL (burst PLL) an offset is added to the values for U and V, so that the phase of the sampling frequency changes correspondingly. As f only has an effect during the burst interval, it need not be disconnected during the remaining active video line.

A horizontal and vertical peaking/smoothing can be achieved in that on the values $b_0$ to $e_0$ and $b_1$ to $e_1$ is superimposed a horizontal and/or vertical "contrast profile", i.e., the suitable WHT coefficients are multiplied with corresponding variable factors.

In the same way, it is also possible to bring about a pre-filtering for horizontal and/or vertical subsample values. Whereas in the pixel domain an adaptive noise suppression is difficult to achieve, this is easily brought about in the WHT domain in that smaller WHT coefficient values are suppressed.

Apart from the chroma automatic gain control, intensification control, which requires an 8 bit resolution, a 5 bit resolution is adequate for controlling all the other functions.

Unlike in the pixel domain in which the different settings and controls influence the different signals in different stages of the overall digital decoder and require corresponding multipliers, in the case of the decoder according to the invention all the settings and controls can be performed by multiplications in the WHT range with a single multiplier stage, which processes a set of different factors. The two color difference signals U and V can be directly taken from the WHT domain and require no inverse transformation. A multistandard decoder consequently requires no further adaptation for reading out the U and V color difference signals, if it is switched between different standards, such as NTSC and PAL than the reading out of different WHT coefficients can be used for identifying the standard of the particular video signal.

As the color difference signals U and V are directly available as WHT coefficients $WHT_{1,1}$ and $WHT_{1,2}$, no inverse Walsh-Hadamard transformation is necessary for these components, but must be performed for the luminance component Y.

Figure 9:
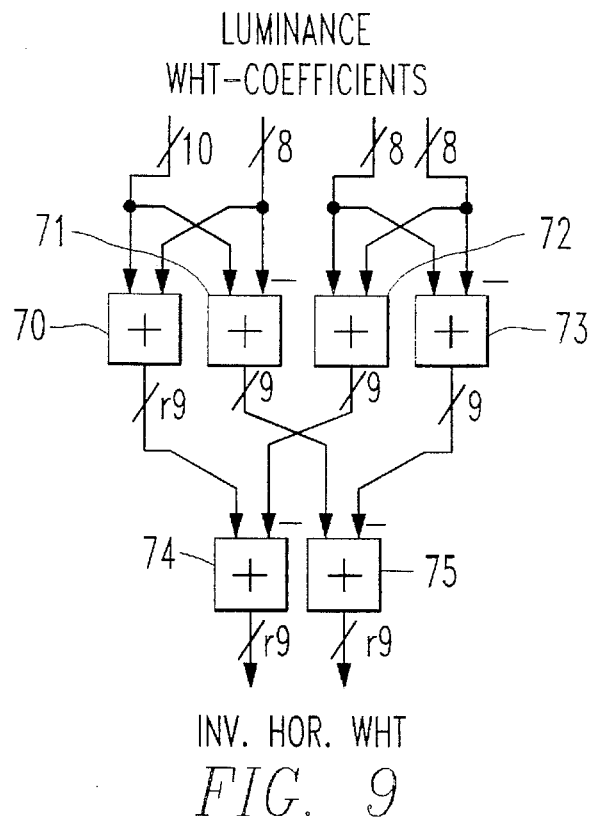
FIG. 9 A circuit diagram for realizing the horizontal IWHT for the decoder of FIG. 5.

FIG. 9 shows the circuit diagram for the inverse horizontal WHT. The horizontal IWHT of FIG. 9 comprises six adders 70 to 75, which are interconnected as shown in FIG. 9. As a result of the overlap of the transformation windows or blocks of the two pixels for successive transformation windows the inverse horizontal WHT need only produce two of four possible output values for each window. To avoid errors at the block boundaries, it is advantageous to choose the two central values, which result from the simplified structure for the inverse horizontal structure WHT shown in FIG. 9.

For the two vertical spectra, the input and output values are alternatively advanced by means of a not shown multiplexer circuit. If the color killer is active (Coki=1), use is made of the entire spectrum for the luminance signal.

Figure 10:
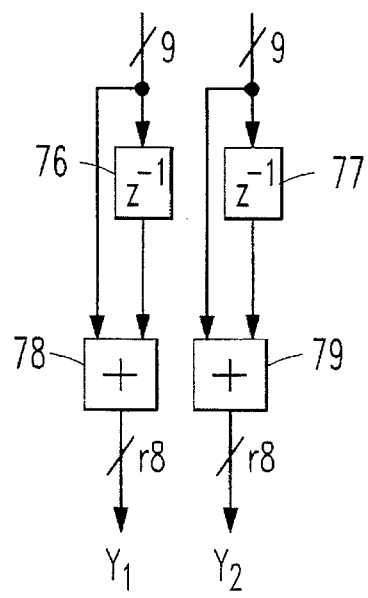
FIG. 10 A circuit diagram for realizing the vertical IWHT for the decoder of FIG. 5.

The output signal of the horizontal IWHT circuit 39 is transferred to the vertical IWHT circuit 40 shown in FIG. 10. It has two delay elements 76, 77 and two adders 78, 79, which are interconnected in the manner shown. If it is only necessary to calculate the pixels of one line at a particular time, the vertical IWHT only has to calculate the vertical sum (not the difference) of the two output values of the horizontal IWHT, as shown in FIG. 7. The line delay can be replaced by a single register 76 or 77. For every other clock pulse, the vertical IWHT simultaneously produces two luminance pixels. The resolution of the output signal is rounded off to 8 bits.

If the frequency of the values for U, V and Y outputted by the digital decoder does not correspond to the desired frequency for the further processing of these signals, they can be converted by means of the output sample rate converter 41 into signal values of a desired output frequency.

The features of the invention disclosed in the description, drawings and claims can be significant for the different embodiments of the invention, either singly or in the form of combinations.

While the method(s) herein described, and the form(s) of apparatus for carrying this (these) method(s) into effect, constitute preferred embodiments of this invention, it is to be understood that the invention is not limited to this (these) precise method(s) and form(s) of apparatus, and that changes may be made in either without departing from the scope of the invention, which is defined in the appended claims.

What is claimed is:

1. A method for digitally decoding a composite video signal (CVBS), comprising a brightness signal (luminance component Y) and two color difference signals (chrominance components U, V), which modulate a color subcarrier according to the quadrature amplitude modulation principle, comprising the steps of:;

transforming a plurality (N) of sample values of the video signal by means of a Walsh-Hadamard transformation (WHT) from the pixel domain into a WHT domain resulting in a WHT matrix, deriving the color difference signals (U, V) as specific WHT coefficients of the WHT matrix obtained, subtracting the WHT coefficients that determines the color difference signals (U, V) from the WHT matrix, transforming the WHT matrix back into the pixel domain by means of an inverse Walsh-Hadamard transformation (IWHT), and deriving the brightness signal (Y) from the IWHT result.

2. The method according to claim 1, wherein the step of transforming a plurality of sample values further comprises the steps of;

delaying the sample values of the video signal by one line, transforming each of N sample values of the actual line and N sample values of the delayed line by means of a vertical WHT; and transforming the resulting WHT coefficients by means of a horizontal WHT.

3. The method according to claim 2, further comprising the steps of:

adding N sample values of the delayed line to corresponding N sample values of the actual line resulting in vertical sum values in order to form a low-pass filter;

subtracting said N sample values of the delayed line from said N sample values of the actual line in resulting in vertical difference values order to form a high-pass filter; and utilizing the vertical sum and difference values as input values for the horizontal WHT.

4. The method according to claim 1 further comprising the step of:

digitizing the video signal at a sampling frequency of four times the color subcarrier frequency (4·fsc), so that with PAL video signals 1135 sample values per line are produced and with NTSC video signals 910 sample values per line are produced.

5. The method according to claim 1 wherein N=4.

6. The method according to claim 1 wherein N=8.

7. The method according to claim 1 further comprising the step of multiplying the resulting WHT matrix with a control and setting matrix.

8. The method according to claim 1 further comprising the step of using the least significant WHT coefficient ($WHT_{0,0}$) of the WHT matrix for deriving the line sync pulse of the video signal.

9. The method according to claim 1 further comprising the step of suppressing a low order of WHT coefficients $WHT_{x,y}$ << WHT for reducing noise.

10. The method according to claim 2 further comprising the step of reproducing the low order WHT coefficients with a lower precision (resolution) than higher order WHT coefficients for reducing quantization noise.

11. A digital decoder for decoding a composite video signal (CVBS), having a brightness signal (luminance component Y) and two color difference signals (chrominance components U, V), comprising:

a transformer, for transforming a plurality of sample values for the video signal by a Walsh-Hadamard transformation (WHT) from the pixel domain into the WHT domain, a setting circuit, which multiplies the WHT coefficients of the resulting WHT matrix with control and setting parameters, the setting circuit having an output for deriving specific WHT coefficients as color difference signals (U, V); and an inverse transformer, for transforming back the remaining WHT coefficients of the WHT matrix by means of an inverse Walsh-Hadamard transformation (IWHT) into the pixel range and outputs same as the brightness signal (Y).

12. The digital decoder according to claim 11, wherein the transformer further comprising a vertical and a horizontal WHT, being connected in series.

13. The digital decoder according to claim 12, wherein the vertical transformer circuit further comprising:

a delay element, which delays by one line the video signal N sample values resulting in N delayed sample values;

an adder, which adds the N delayed sample values to corresponding N sample values of the actual line to form a high-pass filter; and a multiplexer in order to selectively output the vertical sum and difference values as input values for the horizontal transformer.

14. The digital decoder according to claim 12 wherein the horizontal transformer has an adding mechanism, which performs the following operation:

$$F(u,v,t) = \sum_{x=0}^{N-1} f(x,t) \cdot \Phi_{u,v}(x)$$

in which F(u,v,t) are the transformed coefficients in the WHT domain, f(x,t) the sample values in the pixel range and $\Phi_{u,v}$ the Walsh-Hadamard transformation matrix.

15. The digital decoder according to claim 11 wherein N=4.

16. The digital decoder according to claim 11 wherein the horizontal transformer further comprising (35) eight adders (50-57), whereof in each case four are connected in parallel, the output signals of the first four adders serving as input signals of the second four adders, in accordance with the following equation:

$$\begin{bmatrix} WHT_0 \\ WHT_1 \\ WHT_2 \\ WHT_3 \end{bmatrix} = \begin{bmatrix} +1 & +1 & +1 & +1 \\ +1 & +1 & -1 & -1 \\ +1 & -1 & -1 & +1 \\ +1 & -1 & +1 & -1 \end{bmatrix} \times \begin{bmatrix} f(1) \\ f(2) \\ f(3) \\ f(4) \end{bmatrix}.$$

17. The digital decoder according to claim 11 further comprising:

an input sample rate converter, which converts the input sample values of the video signals (CVBS) digitized at a first given clock frequency into desired sample values at a second virtual sampling frequency of four times the color subcarrier frequency (4·fsc).

* * * * *

UNITED STATES PATENT AND TRADEMARK OFFICE
CERTIFICATE OF CORRECTION

PATENT NO.  : 5,621,477
DATED       : April 15, 1997
INVENTOR(S) : Walter Demmer It is certified that error appears in the above-identified patent and that said Letters Patent is hereby corrected as shown below:

Title page, item [73], Assignee:  should be --Harris Corporation, Melbourne, FL--.

Signed and Sealed this

Thirteenth Day of January, 1998

Attest:

BRUCE LEHMAN

*Attesting Officer*          *Commissioner of Patents and Trademarks*